(12) United States Patent
Umeda et al.

(10) Patent No.: US 6,198,190 B1
(45) Date of Patent: *Mar. 6, 2001

(54) ALTERNATOR FOR AN AUTOMOTIVE VEHICLE

(75) Inventors: Atsushi Umeda; Tsutomu Shiga; Shin Kusase, all of Kariya (JP)

(73) Assignee: DENSO Corporation, Kariya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/349,161

(22) Filed: Jul. 9, 1999

Related U.S. Application Data

(60) Division of application No. 09/039,480, filed on Mar. 16, 1998, which is a continuation-in-part of application No. PCT/JP97/03374, filed on Sep. 22, 1997, and a continuation-in-part of application No. PCT/JP97/01778, filed on May 26, 1997.

(51) Int. Cl.$^7$ .............................. H02K 1/00; H02K 3/04; H02K 9/02

(52) U.S. Cl. ............................ 310/179; 310/198; 310/58

(58) Field of Search .................................. 310/68 D, 179, 310/198, 184, 58, 62, 201, 215, 207, 263

(56) References Cited

U.S. PATENT DOCUMENTS

| | | |
|---|---|---|
| 1,822,261 | 9/1931 | Apple .................................... 310/201 |
| 2,407,935 | 9/1946 | Perfetti et al. ........................ 310/201 |

(List continued on next page.)

FOREIGN PATENT DOCUMENTS

| | | |
|---|---|---|
| 3704780A1 | 11/1988 | (DE) . |
| 39 01 098 | 4/1990 | (DE) . |
| 0 740 403 A1 | 4/1996 | (EP) . |
| 48-442 | 1/1973 | (JP) . |
| 50-47102 | 4/1975 | (JP) . |

(List continued on next page.)

OTHER PUBLICATIONS

Masami, "AC Generator for Vehicle", Patent Abstracts of Japan, Publication No. 3–27748, Feb. 6, 1991.

Kazuhiko, "Motor Having Stator Winding", Patent Abstracts of Japan, Publication No. 9–19096, Jan. 17, 1997.

Toronron, "Thrust Bearing", Patent Abstracts of Japan, Publication No. 9–117095, May 2, 1997.

*Primary Examiner*—Clayton LaBalle
(74) *Attorney, Agent, or Firm*—Pillsbury Madison & Sutro LLP

(57) ABSTRACT

The present invention provides a compact, efficient and noiseless alternator for an automotive vehicle which employs a double-layer coil arrangement in a slot for eliminating coil end interference as well as improving the space factor. An automotive alternator comprises a Lundel-type core rotor with 16 poles, and a stator with toothed portions of 96 poles spaced by slots. U-shaped conductor segments are installed in the slots. One portion of the conductor is accommodated in an outer layer portion of a predetermined slot, while the other portion is accommodated in an inner layer portion of a slot phase shifted by an electric angle of 180°. In this manner, all of the slots are separated into the inner and outer layers to accommodate a plurality of conductor segments. These conductor segments are connected only at one side of the stator to form a total of twelve wavy winding coils. These twelve wavy winding coils are divided into three groups each consisting of a serial connection of four wavy windings to constitute one phase of a three-phase stator coil.

36 Claims, 20 Drawing Sheets

U.S. PATENT DOCUMENTS

| | | | |
|---|---|---|---|
| 2,928,963 | 3/1960 | Bertsche et al. | 310/168 |
| 3,450,913 | 6/1969 | Baker et al. | 310/263 |
| 3,453,468 | 7/1969 | Lund | 310/180 |
| 4,238,702 | 12/1980 | Belova et al. | 310/179 |
| 4,454,464 * | 6/1984 | Stroud | 310/198 |
| 4,870,307 | 9/1989 | Kitamura et al. | 310/54 |
| 5,093,591 | 3/1992 | Kitamura et al. | 310/62 |
| 5,097,167 | 3/1992 | Kanayama et al. | 310/201 |
| 5,122,705 | 6/1992 | Kusase et al. | 310/68 D |
| 5,132,581 * | 7/1992 | Kusase | 310/263 |
| 5,160,864 * | 11/1992 | Saito | 310/263 |
| 5,191,257 | 3/1993 | Sugiyama | 310/198 |
| 5,536,987 | 7/1996 | Hayashi et al. | 310/263 |
| 5,574,324 | 11/1996 | Hirama et al. | 310/194 |
| 5,691,590 | 11/1997 | Kawai et al. | 310/184 |
| 5,708,316 | 1/1998 | Ishida | 310/184 |
| 5,742,498 | 4/1998 | Taniguchi | 363/145 |
| 5,778,512 | 7/1998 | Ichikawa et al. | 29/598 |
| 5,845,389 | 12/1998 | Roberts et al. | 310/45 |

FOREIGN PATENT DOCUMENTS

| | | |
|---|---|---|
| 56-98358 | 7/1981 | (JP) . |
| 59-501691 | 4/1984 | (JP) . |
| 59-159638 | 9/1984 | (JP) . |
| 61-221561 | 1/1986 | (JP) . |
| 62-272836 | 11/1987 | (JP) . |
| 63-257435 | 10/1988 | (JP) . |
| 63-274335 | 11/1988 | (JP) . |
| 64-5340 | 1/1989 | (JP) . |
| 2-21440 | 8/1990 | (JP) . |
| 3-159549 | 7/1991 | (JP) . |
| 4-26345 | 1/1992 | (JP) . |
| 6-165422 | 6/1994 | (JP) . |
| 7-303351 | 11/1995 | (JP) . |
| 8-205441 | 8/1996 | (JP) . |
| 8-298756 | 11/1996 | (JP) . |
| 8-331818 | 12/1996 | (JP) . |
| 9-56128 | 2/1997 | (JP) . |
| 9-182337 | 7/1997 | (JP) . |
| WO 84/01478 | 4/1984 | (WO) . |
| WO 92/06527 | 4/1992 | (WO) . |

* cited by examiner

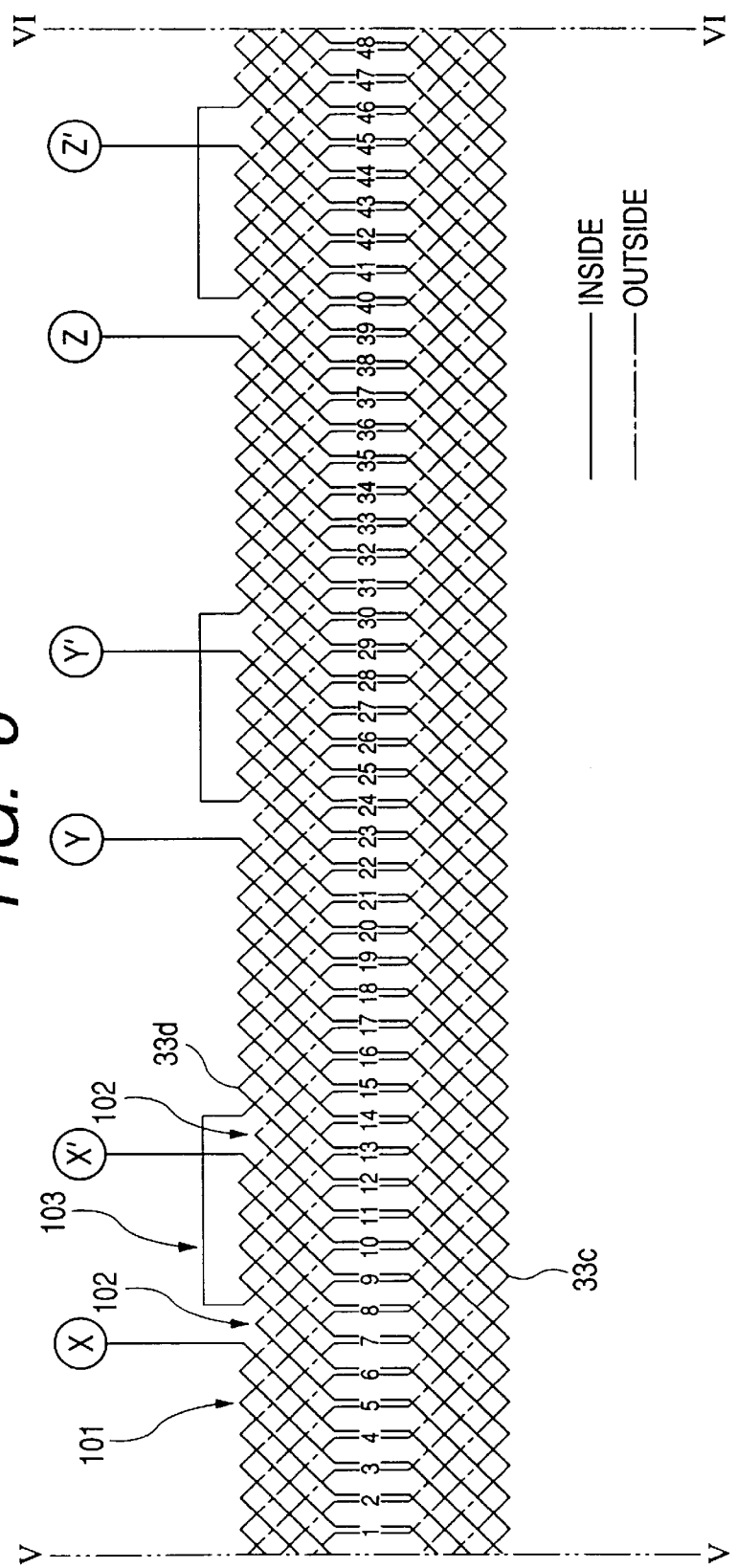

ALTERNATOR FOR AN AUTOMOTIVE VEHICLE

This is a division of application Ser. No. 09/039,480, filed Mar. 16, 1998 which is a continuation in part of PCT/JP97/03374 filed Sep. 22, 1997 and PCT/JP97/01778 filed May 26, 1997, the contents of which are incorporated herein by reference.

BACKGROUND OF THE INVENTION

The present invention relates to an alternator for an automotive vehicle, which is preferably installed in a passenger vehicle, a truck or the like.

Vehicle bodies tend to be formed into slanted nose shapes in order to reduce their aerodynamic resistance. However, a vehicle body is also required to provide enough space for the passenger compartment. To satisfy both requirements, the engine compartments of automotive vehicles have become so narrow and crowded that only limited space is available for installing an alternator. Meanwhile, to improve fuel economy, the rotation rate of the engine tends to be reduced. Correspondingly, the rotation rate of the alternator is lowered. At the same time, however, there is a need to increase electric loads such as safety control devices, etc. Thus, improving the generating ability of the alternator is strongly required. In other words, a compact, powerful, and inexpensive automotive alternator is needed.

Furthermore, it is desirable that noises leaking from vehicles be reduced. Providing a quiet passenger compartment leads to increased product appeal. To this end, engine noises have recently been reduced. However, engine accessories need to rotate at relatively high speeds. Thus, fan noises and magnetic noises of automotive alternators are becoming the main noises emitted from automotive vehicles.

Conventionally, the stator winding generally used in an automotive alternator is arranged by using a continuous wire assembled with a stator core. In such a stator winding arrangement, various improvements have been proposed for satisfying the requirements of compactness, higher output, lower noise, etc.

For example, as disclosed in Published Unexamined Japanese Patent Application No. 7-303351, providing a shorter winding is effective to reduce the winding resistance. According to a 2π/3 short-pitch winding technique, the winding is wound without causing interference between phases in a radial direction. However, there is a problem in that the winding factor is substantially worsened and accordingly the generated voltage is greatly reduced. Furthermore, performing such a winding operation is difficult.

According to other proposed techniques, coil ends are pre-shaped or thinned to avoid interference during the winding operation. However, problems arise in that the winding operation is complicated and the winding resistance value is increased. Furthermore, according to these techniques, the interference of the coil ends cannot be solved completely. In each slot, the coil is located in an offset condition where no more than half of a cross section is available as a geometrical space for accommodating the coil. This arrangement results in a drawback because the resistance cannot be reduced. Also, due to the above-described offset arrangement of the coil in the slot, the coil configuration becomes different in each phase, making the resistance value and the inductance of the winding different in each phase. Thus, the flow of current is different in each phase, causing a local temperature increase which may worsen the performance of the alternator and increase the magnetic noise.

As disclosed in Published Unexamined Japanese Patent Application No. 59-159638, the coil end may be formed into a flattened configuration to reduce the air flow resistance. However, according to the arrangement shown in this prior art, the air flow resistance is still high. Sufficient cooling ability cannot be expected, and noise cannot be reduced satisfactorily.

Furthermore, to realize compactness and high output, there is a technique for increasing the magnetic flux by reducing the air gap between the rotor and the stator. However, this technique requires enlarging the cross-sectional area of the stator core in accordance with an increase of the magnetic flux, thereby reducing the slot area and increasing the winding resistance. As a result, the effect of increased output is largely canceled. In short, it is important to optimize the balance between the core and the winding which cooperatively constitute the stator.

To obtain an improved output, an optimization will be attained in the selection of design data for the core cross section and the winding. However, a remaining problem to be solved is cooling of the coil ends which serve as a heat generation source. For example, a large-scale fan will be required for cooling the electric conductors through an insulating film and a fixing member provided on the surface thereof. The fan needs to be disposed adjacent to the coil ends. However, according to a conventional winding, the coil ends are undulated due to the interference between different phases. This increases the higher-order fan noise. When this noise creates a nuisance for vehicle passengers, it must be reduced. For example, the inner face of the coil ends facing the fan may be smoothed as an ideal surface by using a complicated winding method, or the cooling air amount may be reduced by sacrificing fan efficiency.

In the process of seeking compactness and higher output, there will be a problem in that the magnetic noise is increased due to an increased magnetic force acting between the rotor and the stator. In general, an automotive alternator is equipped with a rectifier which cuts the output voltage at a predetermined level to charge a battery. Thus, the generated voltage has a rectangular waveform. It is known that spatial higher harmonics in the clearance between the stator and the rotor chiefly comprise tertiary higher harmonic components. Accordingly, a magnetic force acting between the stator and the rotor comprises the square components of the tertiary higher harmonic components. The magnetic force thus created will generate a magnetic ripple force.

To eliminate such magnetic forces, Published Unexamined Japanese Patent Application No. 4-26345 proposes to use two sets of three-phase windings which are mutually phase shifted by an electric angle of 30°. Two outputs of these two three-phase windings are combined so that their magnetic ripple forces will cancel each other.

However, this conventional winding arrangement cannot solve the coil end interference derived from the conventional winding configuration. The number of required slots is doubled, which requires a careful winding operation for a thin wire wound in the slots. This problem is difficult to solve. Clearly, when compactness and higher output are the object, there are many new problems to be solved.

A stator winding having a continuous wire is widely used in conventional automotive alternators. However, this type of stator winding cannot satisfy all of the requirements above, such as compactness, higher output and lower noise, which are contradictory to each other.

On the other hand, a general large generator, such as an induction-type generator, may comprise two layered conductors accommodated in a stator slot which constitute inner and outer layers disposed in a radial direction of the stator slot. To eliminate the interference between different phases at the coil ends, the conductors of the inner and outer layers are alternately connected.

However, there was a problem in that the above-described larger generator could not be directly used as an automotive alternator. More specifically, the automotive alternator needs to supply electric power to the automotive electric loads during an engine idling condition corresponding to the lowest engine speed region and equivalent to the alternator's rotation range of approximately 1,500 rpm. To this end, it is necessary to generate approximately 15 V, which is equivalent to a sum of a battery voltage and a diode drop, at the above-described rotational speed range, i.e., approximately 1,500 rpm or less. However, for an automotive alternator of 1 to 2 kW used for a general passenger vehicle or a truck, it is difficult to generate 15 V at such a low rotation. The above-described general large induction-type generator has about two conductors per slot which is chiefly dependent on a magnetic flux determined by the physical size. When the number of conductors is as small as two, it is difficult to supply sufficient electric power because an electromotive voltage cannot be obtained satisfactorily at the above-described low rotation region. Furthermore, there is a recent tendency to reduce the idling rotation further in order to improve fuel economy. Responding to such a requirement is difficult for the above-described general large induction-type generator.

To increase output at a low-speed region, it may be possible to employ a multi-polarized arrangement operated by higher frequencies. Toward this end, the above-described general large-scale generator uses a salient rotor having an axial length substantially equal to that of the stator core. According to the salient rotor, the magnetomotive force of each magnetic pole is reduced in response to an increase of the magnetic pole number because of a reduction of wiring space in the rotor. Thus, it is difficult to increase the output. In other words, the above-described automotive alternator cannot attain the required performance.

In general, providing clearance inside the salient rotor is structurally difficult. Thus, there is a problem in that the cooling air cannot be introduced and guided to an inner peripheral surface of the rotor. Furthermore, the cooling air cannot be introduced and guided to a field coil provided in the rotor.

Published Unexamined Japanese Patent Applications No. 62-272836, No. 63-274335 and No. 64-5340 disclose automotive alternators which use U-shaped electric conductors, i.e., so-called conductor bars. However, according to this prior art, a plurality of stator cores are laminated in a circumferential direction so as to form a cylindrical shape. Thus, magnetic resistance increases with respect to the passing direction of the magnetic flux, and the required performance cannot be realized. There are also many problems to be solved, for example, maintaining the practical strength.

PCT document WO 92/06527 proposes an arrangement of an automotive alternator which uses conductor bars for a stator. According to the arrangement shown in this prior art, a total of four electric conductors are disposed in a square shape in each slot. In a slot, clearance is provided between two electric conductors arrayed in a circumferential direction at a coil end. According to a conventional ventilation structure for an automotive alternator, a cooling fan is provided outside a frame, and a ventilation passage is provided for guiding cooling air in the axial direction. On the contrary, according to applicant's ventilation structure, a cooling fan is located inside a frame so that cooling air can be directly supplied to the coil end. With this arrangement, the cooling ability is greatly improved so that compactness and higher output can be realized. Accordingly, providing a clearance between coil ends makes it possible to reduce the air resistance and increase the cooling ability. Furthermore, using the U-shaped conductor bars makes it easy to insert the conductor bars into slots offset by a magnetic pole pitch.

However, according to this arrangement, the cross section of each electric conductor is limited. If the cross section of each electric conductor is increased to reduce the electric resistance and increase the output, then it will not be possible to provide the above-described clearance, which will significantly worsen the cooling ability and formability at the coil end. To secure sufficient clearance, it may be effective to reduce the number of electric conductors from four to two per slot. However, with such a small number of conductors, the device will not be able to generate an output at an idling rotation, i.e., at a low-speed region, and thus cannot be used as an automotive alternator.

U.S. Pat. No. 2,928,963 proposes an AC generator which comprises a stator using conductor bars and a Lundel-type pole core. However, according to this invention, a ventilation structure extends only in an axial direction. This ventilation structure differs from the present general ventilation structure. Furthermore, even in an arrangement shown as another embodiment, no internal fan is provided. In view of the foregoing, it is concluded that no improvement is shown for increasing the cooling ability to realize both compactness and higher output. Furthermore, according to the arrangement disclosed in this prior art, each slot accommodates two conductors. Thus, as described above, it will be difficult to obtain an output in the lower-speed region with such a device.

SUMMARY OF THE INVENTION

In view of the above-described problems encountered in the prior art, the present invention has an object to provide a highly practical and improved alternator for an automotive vehicle which is capable of satisfying recent performance requirements for alternators.

Another object of the present invention is to provide an alternator for an automotive vehicle which is compact in size, powerful in output, and calm in noise level.

Another object of the present invention is to provide an arrangement for a rotor and a stator winding which is capable of producing the output required in a low-speed region of an alternator, and to provide a novel cooling arrangement for the coil end of a stator winding, thereby providing an alternator capable of obtaining the high output required for automotive alternators, suppressing a reduction in efficiency due to heat generation, and preventing a reduction in output.

Another object of the present invention is to provide an alternator for an automotive vehicle which is capable of improving the space factor in a slot of a stator winding while increasing cooling ability and reducing noises at the outside of the slot as a result of a cooperation with the rotor.

Another object of the present invention is to provide an alternator for an automotive vehicle which is capable of suppressing a local temperature increase in the stator winding and suppressing magnetic noises.

To accomplish the above objects, the present invention provides an alternator for an automotive vehicle, comprising a field rotor with N and S poles formed alternately in a circumferential direction, a stator including a stator core disposed in a confronting relationship with the rotor and a multi-phase stator winding associated with the stator core, and a frame supporting the rotor and the stator. In this alternator, the field rotor comprises a Lundel-type core having a plurality of magnetic poles serving as the N and S poles. The stator core comprises laminated cores formed with a plurality of slots extending across laminated plates. The multi-phase stator winding comprises a plurality of electric conductors. The plurality of electric conductors constitute at least one pair, and are inserted in the slots arrayed in the depth direction so as to constitute an inner layer and an outer layer. The electric conductors are insulated from each other in each slot, and the plurality of electric conductors are partly disposed out of the slots so as to extend from an end face of the stator core and form coil ends. The coil ends have a predetermined connecting pattern according to which two of the electric conductors disposed in different slots as different layers are serially connected, thereby forming a coil end group chiefly repeating the connecting pattern at the end face of the stator core. The plurality of electric conductors of the coil end extend in a direction intersectional with a flow direction of cooling air introduced in the frame, so that the cooling air can flow across the electric conductors of the coil end. The plurality of electric conductors accommodated in a same slot as different layers cooperatively constitute a same-phase winding. A first winding comprises the electric conductors accommodated in the same slot, a second winding comprises other electric conductors accommodated in another slot adjacent to the same slot, and the first winding and the second winding are combined so as to lo generate a summed-up output.

According to the adopted connecting pattern, two of the electric conductors disposed in different slots as different layers are serially connected. Thus, the electric conductor forming a predetermined layer in one slot is serially connected to the electric conductor forming a different layer in another slot.

With this arrangement, it becomes possible to suppress the coil end interference, realize a high space factor for the stator winding, and increase the output. Furthermore, the cooling air flows across the coil end. The effective surface area is greatly increased compared with the coil end of a conventional stator winding, which remarkably improves the cooling ability of the electric conductors at this portion and produces a higher output. Furthermore, the conductor length of each phase stator winding depending on the position in the slot as well as the leakage inductance can be unified. Accordingly, the current flowing through each stator winding can be unified, and the amount of heat generated in each phase can be equalized. It becomes possible to eliminate the local heat generation at the stator winding as well as the unbalance of the magnetic motive force. Temperature and noise reduction can be realized. Furthermore, the coil end has no surface roughness and forms a uniform repetitive pattern. As the cooling air flows across the coil end, noise caused by the cooling air can also be reduced.

Furthermore, assembling the Lundel-type rotor is advantageous in that modification of the pole number as well as realization of a multi-pole arrangement can be easily accomplished by changing the forming configuration of the core (hereinafter referred to as the pole core). Furthermore, the magnetic poles have appropriate rigidity against centrifugal forces. Additionally, the field coil can be securely installed on the boss portion provided at an internal center of the pole core. Thus, the rotor has adequate durability against centrifugal forces; in other words, it can rotate at two to three times the engine speed.

Thus the alternator of the present invention differs from the above-described general induction machine in that it can operate at higher frequencies. Even in a low-turn condition where the electric conductor number per slot is small, the present invention makes it possible to generate an electric power at a low speed of, for example, 1,000 rpm, which is sufficiently lower than the 1,500 rpm idling rate of an automotive vehicle.

Assembling the Lundel-type rotor is advantageous in that a space is easily provided between magnetic poles for cooling of the field coil. Furthermore, the magnetic poles have a function of guiding cooling air in the axial direction when they rotate. This feature is utilized for adequately conveying the ventilation air in the axial direction or in the radial direction. A rotor used in a general induction machine is a hollow cylindrical salient rotor which has no space between the magnetic poles. Accordingly, as compared with the salient rotor, it is possible to effectively cool down the inner cylindrical surface of the stator as well as the stator winding and the field coil.

It is also preferable that the plurality of electric conductors accommodated in a same slot as different layers cooperatively constitute a same-phase winding. Additionally, an output of the first winding comprising the electric conductors accommodated in the same slot is summed with an output of the second winding comprising other electric conductors accommodated in another slot adjacent to the same slot.

A higher output is produced by serially connecting the electric conductors which are disposed in the same slot and induce the same-phase electromotive forces. Furthermore, a large output is obtained even when the first winding and the second winding each have a relatively small output, because the output of the first winding comprising the electric conductors accommodated in the same slot is summed with the output of the second winding comprising other electric conductors accommodated in another slot adjacent to the same slot.

Preferably, the stator and the rotor cooperate to generate a voltage equal to or more than 15 V from the winding end in an idling speed region of the engine which drives the rotor.

With this arrangement, it becomes possible to supply the required amount of electric power to electric loads when an automotive vehicle is operated in an idling condition. Of course, a battery will be able to supply a supplementary electric power to the loads if the required power level is increased in this idling condition. The supply amount of such a supplementary electric power can be reduced. When the automotive vehicle is traveling, an increased output is generated to recharge the battery quickly. Even in a case where a lower idling speed is adopted, the above-described electric power generation ability is maintained. Thus, it becomes possible to improve the fuel economy.

It is possible to adopt an arrangement wherein the electric conductor accommodated in one slot is serially connected to another electric conductor accommodated in another slot disposed adjacent to said one slot. These serially connected electric conductors cooperatively constitute a stator winding of the same output phase.

This arrangement is advantageous in that a higher AC output is obtained as a summed-up value of two AC outputs of different phases. Accordingly, even when each electric conductor accommodated in one slot produces a relatively small output, the summed-up output is high.

Especially when the electric conductors are disposed in layers in each slot, the number installable in the slot is limited. This condition results in a limited output in the same phase. However, the above-described serial connection solves such drawbacks and makes it possible to produce the required output. Hence, not only the space factor in each slot but the cooling ability at the coil end can be improved, without reducing the output.

It is preferable that a plurality of slots are spaced at predetermined intervals corresponding to a N-and-S magnetic pole pitch of the rotor so as to constitute a first slot group. A plurality of slots are disposed adjacent to the first slot group so as to constitute a second slot group. The electric conductors accommodated in the first slot group are serially connected to form the first winding, while the electric conductors accommodated in the second slot group are serially connected to form the second winding.

Furthermore, it is preferable that the slots are disposed at regular intervals equivalent to an electric angle of 30°. Some of the electric conductors accommodated in the plurality of slots constitute a first serial conductor group. The first serial conductor group comprises serially connected electric conductors accommodated in the slots of the first slot group which are mutually spaced by a magnetic pole pitch. Electric conductors accommodated in the slots of the second slot group adjacent to the first slot group are serially connected to constitute a second serial conductor group. The first serial conductor group and the second serial conductor group are connected in series to constitute a winding having a winding end connected to a rectifier.

With this arrangement, some of the conductors accommodated in the plurality of slots, being arranged at regular intervals equivalent to an electric angle of 30°, constitute the first serial conductor group comprising serially connected electric conductors accommodated in slots mutually spaced by a magnetic pole pitch. All of the conductors generate electromotive voltage components of the same phase which are directly summable. Thus, the generated electric power per unit length of the electric conductor is maximized. Furthermore, the conductors accommodated in neighboring slots cooperatively constitute the second serial conductor group. These neighboring slots are closest in the phases of the produced voltages to the first serial conductor group. Thus, the second serial conductor group generates a higher output in the same manner.

The first serial conductor group and the second serial conductor group are serially connected to constitute one phase. They are added as vectors. Thus, a maximized electromotive voltage per unit length is produced as a total value. Furthermore, as the slot interval is approximately 30° in the electric angle, the second conductor group is neighboring to the first conductor group by the electric angle of approximately 30°. This is effective to reduce the magnetic ripple force causing the magnetic noises. Thus, the magnetic noises can be reduced. In this case, it should be understood that the electric angle of approximately 30° comprises a range from 29° to 31°. It is needless to say that, when the neighboring relationship is within this range, the above-described magnetic ripple force can be sufficiently reduced.

Furthermore, it is preferable to form the first winding comprising electric conductors accommodated in a same slot and the second winding comprising other electric conductors accommodated in another slot positioned adjacent to the above slot. A first rectifier rectifies an AC output of the first winding, a second rectifier rectifies an AC output of the second winding, and the two rectified outputs are summed. This arrangement can compensate for a lower output obtained from each of the individual windings.

A preferable winding may be constituted in the following manner. A plurality of slots are spaced at predetermined intervals corresponding to a N-and-S magnetic pole pitch of the rotor so as to constitute a first slot group. A plurality of slots are disposed adjacent to the first slot group so as to constitute a second slot group. The electric conductors accommodated in the first slot group are serially connected to form the first winding, and the electric conductors accommodated in the second slot group are serially connected to form the second winding.

Furthermore, it is possible to provide two rectifiers. The slots are disposed at regular intervals equivalent to an electric angle of 30°. Some of the electric conductors accommodated in the plurality of slots constitute a first serial conductor group. The first serial conductor group comprises serially connected electric conductors accommodated in the slots of the first slot group which are mutually spaced by a magnetic pole pitch. Electric conductors accommodated in the slots of the second slot group adjacent to the first slot group are serially connected to constitute a second serial conductor group. The first serial conductor group and the second serial conductor group independently constitute windings, two ends of which are connected to the corresponding rectifiers.

This scheme provides another arrangement for the first serial conductor group and the second serial conductor group. With this arrangement, outputs of respective conductor groups are rectified independently and summed if required. Accordingly, a higher output is produced and the magnetic noise can be reduced.

Preferably, the Lundel-type core is defined by the following relationship:

$$L1/L2 \geq 1.5$$

where L1 represents an outer diameter of the magnetic pole of the Lundel-type rotor, and L2 represents a length in a rotational axis of the Lundel-type rotor.

This arrangement is advantageous as compared with a salient rotor. According to the salient rotor, the diameter L1 is limited due to the centrifugal durability of the field coil. To increase the output, the magnetic resistance is reduced by enlarging the length L2 so as to set a smaller ratio L1/L2. On the other hand, the Lundel-type rotor has a centrifugal durability superior to that of the salient rotor. It is thus possible to set the ratio L1/L2 equal to or larger than 1.5. In this case, in response to the rotation, the cooling air can be introduced from an axially outer portion by an enlarged area. The cooling air amount can also be increased, thereby improving the cooling ability.

It is desirable that the plurality of electric conductors accommodated in the same slot are disposed exclusively in a depth direction of the slot. According to this arrangement, all of the electric conductors located out of the slot can be spaced in a radial direction of the stator. This prevents a plurality of coil ends from being brought into contact with each other. Air flow in the coil end group can be smoothed, and noise is reduced as a result of reducing the interference between the cooling air and the coil ends.

It is preferable that all of the electric conductors electrically insulated in the slots are spatially separated at the coil end formed at an axial end portion of the stator core. With this arrangement, all of the electric conductors are adequately cooled down at the coil end, thus realizing a uniform cooling for the electric conductors without any dispersion.

Furthermore, it is preferable that each electric conductor is formed into a rectangular shape conforming to the configuration of a corresponding slot at a portion inserted in the slot. This arrangement makes it easy to increase the space factor of the electric conductors accommodated in the slots. As the rectangular shape conforms to the slot configuration, improved heat transfer is realized between the electric conductors and the stator core. Regarding the rectangular shape, it is important that a cross section coincides with the slot configuration. Besides a square and an elongated rectangle, the cross section may be a flat plane having four sides and round corners or an elongated circle formed by replacing short sides of an elongated rectangle by arcs. When the cross section is a square or an elongated rectangle, the space factor in the slot can be increased. When the electric conductor has a smaller cross section, it will be preferable to use an elongated circle. The above-described cross section can be formed by deforming a circular electric conductor by pressing.

It is preferable that the electric conductors are naked metallic members. An electrical insulating material is interposed between the plurality of electric conductors inserted in the slot as well as between the plurality of electric conductors and the inner walls of the slot for assuring electric insulation. The plurality of electric conductors are also spatially separated at a portion outside the slot.

This arrangement makes it possible to omit the insulation film covering each electric conductor, thus greatly reducing the material costs. Eliminating the possibility of damaging the insulation film during a press processing of each electric conductor can greatly simplify the production process of the electric conductors and reduce the manufacturing cost. In general, insulation films are weak against heat. Thus, omitting insulation film is also effective to increase the thermal reliability. In other words, the durable temperature of the stator winding can be increased, and the reliability against heat generation can thereby be improved.

Furthermore, it is preferable that an overall axial length of the stator comprising the stator core and electric conductors accommodated in the slots is equal to or shorter than an overall axial length of the Lundel-type rotor.

According to this arrangement, a shorter stator can be disposed in the axial direction with respect to the rotor, thus realizing an egg-shaped arrangement. An outer shape of the generator, including a frame, is configured into an egg shape. The required installation space can be reduced. Thus, the mechanical strength can be improved while the magnetic noise is reduced.

Furthermore, it is preferable that toothed core ends are positioned at both sides of the slot, and that at least part of the toothed core is plastically deformed to form an opening of the slot having a width narrower than a distance between the inner walls of the slot, the opening of the slot being provided at an inner peripheral side of the slot.

According to this arrangement, the electric conductors already placed in the slot can be pushed more deeply in the radial direction of the slot when the toothed core ends are plastically deformed, thereby realizing a higher space factor. Furthermore, the toothed portions of the stator core can be fixed sufficiently, which increases the rigidity of the core so as to prevent the stator core from causing vibrations. The magnetic noise can be reduced. Furthermore, providing the inlet portion narrower than the distance between the inner side walls makes it possible to eliminate a fastener member such as a wedge, thus reducing the costs. The toothed end portion is also hardened when the plastic processing is applied. Accordingly, even when the electric conductor used has a higher rigidity, it becomes possible to prevent the electric conductor from exiting in the radially inward direction. Such an arrangement can be employed regardless of the cross-sectional shape of the slot. It is desirable that the slot cross-sectional shape is a parallel slot having a constant width with respect to a depth direction. This shape is advantageous in that the clearance between the conductors and the slot can be maintained at a constant value even when the inner-layer and outer-layer conductors are formed into the same configuration. The space factor can be further increased.

Furthermore, the electric conductor may be formed at least partly into a flat configuration at a portion outside the slot. This arrangement is advantageous in that the heat radiation area of each electric conductor located at the coil end can be enlarged. When a plurality of coil ends are configured into a flattened shape, clearance between adjacent coil ends can be maintained by disposing these coil ends in parallel to the radial direction. This arrangement is also preferable in that the flow resistance of the cooling air can be reduced. It is possible to form the electric conductor into a flat configuration at the entire portion outside the slot. Moreover, it is possible to form the electric conductor into a flat configuration in the slot, too. In this case, the flat configuration comprises an elongated rectangular cross section and an elongated elliptic cross section.

Furthermore, it is preferable that a magnet is interposed between magnetic poles of the field rotor so that the stator is exposed to a magnet flux in addition to a field flux. This arrangement improves the performance of the Lundel-type field rotor, thus realizing an increased output and an increase in efficiency. Such effects can be obtained by solely improving the stator winding so as to increase the heat radiation ability, without loss at the stator side.

Furthermore, it is preferable that a plurality of electric conductors disposed at the coil end receive the cooling air at substantially entire surfaces thereof. According to this arrangement, a higher cooling ability can be uniformly obtained for all of the electric conductors. In the manufacturing, realizing such an arrangement is relatively easy when the electric conductors are arrayed in the radial direction of the slot, or when the electric conductors are naked wires and spatially spaced for electric insulation, or when the electric conductors have rectangular cross sections at a region out of the slot, or any combination thereof. A greatly increased cooling ability is thereby realized.

Furthermore, it is preferable that the coil end group is formed at each axial end portion of the stator core, and two cooling air passages are formed in the frame so as to correspond to respective coil end groups. According to this arrangement, two coil end groups can be reliably cooled by the cooling air introduced by corresponding cooling air passages. The cooling is done by the cooling air flowing across the electric conductors in each coil end group. Thus, fewer problems relating to loss of efficiency will be caused by heat generation. Noise-related problems can also be reduced.

Furthermore, it is preferable that a ventilating means is provided for creating a flow of cooling air in the frame. According to this arrangement, it becomes possible to induce a cooling air flow in the frame. The coil end can be reliably cooled. An appropriate ventilation means may be a dedicated cooling fan, or the Lundel-type field rotor having a capability of causing air flow due to its configuration.

Furthermore, when the ventilation means is provided, it is preferable that the frame is formed with a ventilation hole at a portion corresponding to the coil end group, so that the cooling air can flow across the electric conductors. With this arrangement, the cooling air can flow efficiently across the electric conductors. When the coil end groups are provided at both sides of the stator core, it is preferable to provide separate ventilation holes corresponding to the respective coil end groups.

Furthermore, it is preferable that the ventilation means is provided at an axial end portion of the field rotor for causing a flow of cooling air directed in a centrifugal outer direction, so that the cooling air can flow across the electric conductors. According to this arrangement, the ventilation means is disposed adjacent to the inside of the coil end group of the stator. The cooling air directed in the centrifugal outer direction enters inside the coil end group and then exits to the outside through the ventilation hole formed in the frame. Thus, a strong and increased flow of cooling air can be supplied to the coil end group. As the electric conductors have improved shape at the coil end groups, noises can be reduced while both the cooling ability and the heat radiation can be increased. In this case, it should be noted that the cooling air of the "centrifugal outer direction" possibly includes some axial components in addition to the centrifugal components. The settings for the cooling air direction can be adequately determined in accordance with the cooling requirements of the field rotor.

Furthermore, it is preferable that the ventilation means is provided at both axial end portions of the field rotor. This arrangement makes it possible to obtain cooling air at both axial sides of the field rotor. When the coil end groups are formed at both sides of the stator, each coil end group can be cooled by an exclusively provided ventilation means.

The ventilation means may be a fan having a plurality of blades. With this arrangement, cooling air can be reliably obtained.

Furthermore, it is preferable that the Lundel-type core has a configuration corresponding to the plurality of magnetic poles, so that the Lundel-type core is capable of serving as the ventilation means. With this arrangement, it becomes possible to obtain the cooling air by utilizing the inherent configuration of the Lundel-type core corresponding to the plurality of magnetic poles. When the cooling air can be introduced by using the Lundel-type core only, it becomes possible to omit the fan. The number of parts and the manufacturing man-hours can be reduced. When the Lundel-type core is used as an auxiliary means for supporting the fan, it becomes possible to increase the cooling air amount.

Furthermore, it is preferable that an axial end portion of the Lundel-type core is disposed in an adjacent and confronting relationship to an inner wall surface of the frame. According to this arrangement, the inner wall surface of the frame can serve as a fan shroud. In other words, the cooling air can be guided by utilizing the axial end configuration of the Lundel-type core. In this case, the inner wall surface of the frame capable of acting as the shroud may be an inner wall surface of the frame which is a metallic member, or may be parts or components installed on the frame.

Furthermore, it is preferable that the frame is formed with an inlet hole for the ventilation means, with the inlet hole facing an installation end of a pulley which drives the field rotor, and the outermost diameter of the inlet hole being smaller than the outermost diameter of the pulley. This arrangement makes it possible to provide a practical automotive alternator which can employ a larger-diameter pulley. In other words, both the downsizing and the power-up can be realized. Due to an increased torque, there is a problem in that the belt life is shortened. Thus, there is a necessity of increasing the pulley diameter to reduce the stress applied on the belt. However, according to such an arrangement, the pulley may cover the inlet hole of the frame. This condition increases the flow resistance and therefore reduces the cooling air amount. On the other hand, according to the present invention, an improved cooling ability is brought by the improvement of the stator. In other words, the coil end can be cooled by a small amount of cooling air. This is effective to secure a satisfactory belt life. Thus, both the downsizing and the power-up can be realized.

Furthermore, it is, preferable that the coil end is formed with a connecting pattern in which a first electric conductor and a second electric conductor are serially connected. The first electric conductor is disposed in a first slot as a predetermined layer, while the second electric conductor is disposed in a second slot as a layer different from the first electric conductor. The first and second slots are spaced at an interval corresponding to a N-and-S magnetic pole pitch of the field rotor.

According to this arrangement, the coil ends disposed at each axial end face of the stator core can be arrayed in the same direction. This configuration is effective to prevent the coil ends of different phases from interfering with each other. Thus, the conductors can be inserted deeply in the slot. This improves the space factor and increases the output. Furthermore, the coil ends can form a uniform repetitive pattern without causing surface roughness. This is advantageous to reduce the noises caused by the cooling air.

Furthermore, it is preferable that the coil end is formed by connecting an end portion of the first electric conductor extending from the first slot and an end portion of the second electric conductor extending from the second slot. The first electric conductor and the second electric conductor are formed by separate conductor segments. Also, the end portion of one electric conductor has an angle and a length sufficient for surrounding approximately one half of the magnetic pole pitch.

According to this arrangement, it becomes possible to dispose the segment so as to extend out of the slot. The extended segment is connected with another segment to form a coil end. The coil end thus formed is cooled by the cooling air flowing across the coil ends. The segments are employed by adopting an arrangement having such connections. In this case, the connection can be performed by using an electric connection including ultrasonic welding, arc welding, brazing, etc.

Furthermore, it is preferable that each segment is an U-shaped segment having a turn portion formed by connecting two electric conductors continuously at one axial end portion of the stator core. An end portion of a first U-shaped segment serving as an end portion of the first electric conductor and an end portion of a second U-shaped segment serving as an end portion of the second electric conductor are connected according to the above-described connecting pattern so as to form the coil end at the other axial end portion of said stator core.

This arrangement simplifies the manufacturing process because the number of conductor parts and welding portions can be reduced. As the connecting portions are arranged at one axial end of the stator, the production process can be simplified.

Furthermore, it is preferable that each segment has two end portions protruding from both ends of a corresponding slot. One coil end is formed at one end of the stator core by connecting one end portion of a first segment serving as an end portion of the first electric conductor and one end portion of a second segment serving as an end portion of the second electric conductor according to the above-described connecting pattern. The other coil end is formed at the other end of the stator core by connecting the other end portion of the first segment serving as an end portion of the first electric conductor and the other end portion of the second segment serving as an end portion of the second electric conductor according to the above-described connecting pattern.

According to this arrangement, each electric conductor can be configured into a simplified shape extending in one direction. Thus, the manufacturing process for the electric conductor can be simplified. Moreover, it becomes possible to push the pre-processed electric conductors into the slot from its radial inner peripheral side. This is advantageous compared with an assembling method for inserting the electric conductor from an axial direction, because no processing is necessary for the coil ends. The manufacturing process can be simplified, and the space factor can be further improved.

Furthermore, it is preferable that a sum of circumferential lengths of both end portions of the electric conductor corresponds to the magnetic pole pitch. According to this arrangement, the segments configured into a predetermined shape can be used for forming the stator winding surrounding the stator core. Therefore, the configuration of electric conductors is unified. The number of electric conductor types can be reduced, and it becomes possible to reduce the costs for a manufacturing facility including a press machine for manufacturing electric conductors. When the connecting portions are configured into the same shape and disposed at both sides of the stator core, the production process for the connecting portions can be simplified.

Furthermore, it is preferable that toothed core ends are positioned at both sides of the slot, and at least part of the toothed core end is plastically deformed to form an opening of the slot having a width narrower than a distance between inner walls of the slot, the opening of the slot being provided at an inner peripheral side of the slot.

According to this arrangement, the electric conductors already placed in the slot can be pushed more deeply in the radial direction of the slot when the toothed core ends are plastically deformed. A higher space factor is realized. Furthermore, the toothed portions of the stator core can be fixed sufficiently. This increases the rigidity of the core, so as to prevent the stator core from causing vibrations. The magnetic noises can be reduced. Furthermore, providing the inlet portion narrower than the distance between the inner side walls makes it possible to eliminate a fastener member such as a wedge. This will reduce the costs. Furthermore, the toothed end portion is hardened when plastic processing is applied. Accordingly, even when the electric conductor used has a higher rigidity, it becomes possible to prevent the electric conductor from exiting in the radially inward direction. Such an arrangement can be employed regardless of the cross-sectional shape of the slot. It is desirable that the slot cross-sectional shape is a parallel slot having a constant width with respect to a depth direction. This is advantageous in that the clearance between the conductors and the slot can be maintained at a constant value even when the inner-layer and outer-layer conductors are formed into the same configuration. The space factor can be further increased.

Furthermore, it is preferable that in using a rectifier comprising rectifying elements, part of the electric conductor is directly connected to an electrode of the rectifying element. According to this arrangement, a connecting member of a rectifying circuit, such as a terminal base, can be omitted. Thus, a simplified and compact rectifier can be provided at low cost. When the electric conductors are constituted by segments, it is preferable to differentiate the shape of a segment directly connected to a rectifying element from other segments which are connected according to a predetermined connecting pattern. The segment directly connected to the rectifying element may be longer than the others.

Furthermore, it is preferable that the electric conductor connected to the electrode of the rectifying element has an easily deformable portion between the stator and the electrode of the rectifying element. According to this arrangement, vibrations can be absorbed by the deformation of the electric conductor. It becomes possible to prevent the rectifying element from being damaged, and a high reliability can be realized. The easily deformable portion may be constituted by a partly narrowed electric conductor.

Furthermore, it is preferable that a rectifier is disposed at the same side as the turn portion of the U-shaped segment and connected to the winding end of the stator winding. This arrangement is advantageous when the U-shaped segments are connected at their ends to constitute the winding, because the conductor connected to the electrode of the rectifying element causes no interference with the connecting operation. This makes it possible to adopt a repetitive connection of the same pattern. The manufacturing process can be simplified, and the costs can be reduced.

Furthermore, it is preferable that a rectifier is disposed at a side opposed to the turn portion of the U-shaped segment and connected to the winding end of the stator winding. This arrangement makes it possible to form the turn portions of the U-shaped segments into the same configuration. The man-hours required for manufacturing the segments can be reduced, and the costs can be reduced too.

Furthermore, it is preferable that the stator comprises extended wiring portions mutually short-circuited for constituting a neutral point. This arrangement realizes a connection of the neutral point on the stator. It is preferable to extend a plurality of electric conductors and directly connect them to form the neutral point. Especially when the electric conductors used have a rectangular cross section, sufficient connecting strength is obtained. A sufficient clearance is also provided between coil ends. The heat radiation area can be increased, thus improving the cooling ability of the stator coil.

Furthermore, in the above-described arrangements, it is preferable that the electric conductors constitute only one pair. With this arrangement, assembly man-hours can be reduced in the installation of the conductors into the stator. As the total number of coil ends is small, a clearance between conductors can be easily maintained. As the number of conductor parts and electric connecting portions are small, the manufacturing process can be simplified.

Furthermore, it is preferable that the electric conductors constitute two or more pairs. According to this arrangement, it becomes possible to increase the conductor number per slot to four or more while suppressing the coil end interference. This makes it possible to generate an output from a generator even when the idling rotation of an automotive vehicle is further reduced to realize an improvement of fuel economy and a noise reduction during engine idling.

Furthermore, when two or more pairs of inner-layer and outer-layer electric conductors are disposed, it is preferable that the plurality of electric conductors accommodated in the same slot are disposed exclusively in a depth direction. The plurality of electric conductors are connected with other electric conductors at the coil end group to form a plurality of joint portions. The plurality of joint portions are then arranged into multiple loops and mutually spaced in both a circumferential direction and a radial direction in the coil end group.

According to this arrangement, the joint portions are arranged in a loop fashion along a circumferential direction in accordance with a layout of the plurality of electric conductors, i.e., a placement of slots. Furthermore, the plurality of electric conductors accommodated in the same slot are disposed exclusively in the depth direction of the slot. This configuration is effective to realize a coaxial multiple arrangement in the annular placement of the joint portions. Accordingly, the plurality of joint portions can be disposed separately in both the circumferential and the radial directions, so that clearances can be surely provided between the plurality of joint portions. The capability of easily avoiding short-circuits between the joint portions brings an advantage in the connecting process thereof.

The above-described objects can be accomplished by the following features of the alternator. The stator comprises a laminated stator core formed with a plurality of slots. A plurality of electric conductors are accommodated in the slots. The electric conductors comprise a plurality of U-shaped segments, each having two straight portions accommodated in different slots. The plurality of U-shaped segments have turn portions each serving as a coil end protruding in an axial direction from one end face of the stator core. The turn portions are mutually spaced so as to form a first coil end group. A plurality of the electric conductors accommodated in a same slot as different layers constitute a same phase winding. A first winding comprises the electric conductors accommodated in the same slot. A second winding comprises other electric conductors accommodated in another slot adjacent to the same slot. The first winding and the second winding are combined so as to generate a summed-up output. The plurality of U-shaped segments have end portions protruding in an opposite axial direction from the other end face of the stator core, and the end portions are connected according to a predetermined connecting pattern so as to constitute coil ends of a wiring. These coil ends are mutually spaced so as to form a second coil end group. The field rotor comprises a Lundel-type core having a plurality of magnetic poles serving as the N and S poles. Two ventilation passages are provided at both axial ends of the field rotor. One ventilation passage extends in a radial direction so as to allow air to flow across the first coil end group, while the other ventilation passage extends in a radial direction so as to allow air to flow across the second coil end group.

With the above-described arrangement, it becomes possible to form coil ends having an excellent cooling ability at both ends of the stator. Furthermore, the field rotor provides the ventilation passage guiding the cooling air to each coil end group. This makes it possible to provide a compact and powerful automotive alternator.

Preferably, the field rotor has an axial end portion equipped with a ventilation means for supplying air toward the coil end group. The provision of such a ventilation device makes it possible to supply a strong and increased air flow to the coil end group.

Furthermore, it is preferable that the frame is provided with two ventilation holes serving as outlets of the ventilation passages. One ventilation hole is provided adjacent to an outer peripheral side of the first coil end group, while the other ventilation hole is provided adjacent to an outer peripheral side of the second coil end group. With this arrangement, it becomes possible to provide a ventilation passage extending from the ventilation means to the ventilation hole via the coil end group for discharging the exhausted cooling air.

Furthermore, it is preferable that the U-shaped segments are electric conductors each having an elongated rectangular cross section, and that a longitudinal direction of the cross section is disposed along a radial direction at the coil end. By adopting such an arrangement, it becomes possible to reduce the air flow resistance at the coil end group, and noise can thereby be reduced. In this case, the rectangular shape of the cross section includes an elongated rectangle, a shape obtained by replacing short sides of an elongated rectangle by arcs, and an elongated ellipse.

Furthermore, it is preferable that the electric conductors constitute a plurality of pairs of inner and outer layers. The straight portions of the electric conductors accommodated in the same slot are disposed exclusively in a depth direction of the slot. A plurality of joint portions are formed by connecting the U-shaped segments. The plurality of joint portions are arranged into multiple loops and mutually spaced in both a circumferential direction and a radial direction in the second coil end group.

This arrangement is advantageous when the plurality of pairs of electric conductors are accommodated in the same slots. By making it possible to surely separate the joint portions when they are disposed in the second coil end group, this arrangement brings an advantage in the manufacturing process.

Furthermore, it is preferable that the electric conductors form a multi-phase stator winding having a predetermined phase number. The stator core comprises a plurality of slot groups corresponding to respective phases, each slot group consisting of a plurality of slots spaced at predetermined intervals corresponding to a magnetic pole pitch of the field rotor. A first slot group is constituted by slot groups of multiple phases corresponding to the phase number, and a second slot group is phase shifted from the first slot group by a predetermined electric angle. A multi-phase winding comprises electric conductors accommodated in the slots of the first slot group, another multi-phase winding comprises electric conductors accommodated in the slots of the second slot group, and these two multi-phase windings are combined so as to generate a summed-up output.

According to this arrangement, the total number of electric conductors accommodated in a slot is limited. A required output can be obtained even in an arrangement where an output of the same phase is limited. Especially, the space factor in the slot can be increased by using segments. At the coil end group, not only is the noise level reduced, but the cooling ability is increased. Thus, a higher output is obtained.

Preferably, the first slot group and the second slot group are arranged by using adjacent slots. To reduce the magnetic noises, it is preferable that the first slot group and the second slot group are phase shifted by an electric angle of approximately 30° as a three-phase generator. Regarding the summation of outputs, it is possible to serially connect the windings of adjacent phases in each group so as to produce a summed-up AC output. Alternatively, the summation of the outputs can be done by rectifying the output of each group and then producing a summed-up DC output.

Furthermore, the above-described objects can be accomplished by an alternator for an automotive vehicle, comprising a field rotor with N and S poles formed alternately in a circumferential direction, a stator including a stator core disposed in a confronting relationship with the rotor and a multi-phase stator winding associated with the stator core, and a frame supporting the rotor and the stator. In this alternator, the field rotor comprises a Lundel-type core having a plurality of magnetic poles serving as the N and S poles. The stator core comprises laminated cores formed with a plurality of slots extending across laminated plates. The multi-phase stator winding comprises a plurality of electric conductors. The plurality of electric conductors constitute at least one pair and are inserted in the slots so as to constitute an inner layer and an outer layer arrayed in a depth direction of each slot. The electric conductors in each slot are insulated from each other. The plurality of electric conductors are partly disposed out of the slots so as to extend from an end face of the stator core and form a coil end having a predetermined connecting pattern according to which two of the electric conductors disposed in different slots as different layers are serially connected, thereby forming a coil end group chiefly repeating the connecting pattern at the end face of the stator core. Also, the plurality of electric conductors of the coil end extend in a direction intersectional with a flow direction of cooling air introduced in the frame, so that the cooling air can flow across the electric conductors of the coil end.

This arrangement makes it possible to increase the space factor of the electric conductors in each slot. Furthermore, the cooling air can flow across the plurality of electric conductors at the coil ends. Thus, a higher heat radiation ability can be obtained, and it becomes possible to solve the heat problems arising from an increase of output. Especially, the air flow induced in the frame can be used to solve the heat problems caused by a higher output. In this manner, it becomes possible to adopt a novel arrangement for an alternator different from those of conventional automotive alternators. This arrangement brings an advantage such that the heat problems derived from a higher output can be solved under a practical arrangement using a Lundel-type field rotor.

Furthermore, it is preferable that a plurality of electric conductors accommodated in a same slot are disposed exclusively in a depth direction. The plurality of electric conductors are connected with other electric conductors at the coil end group to form a plurality of joint portions. The plurality of joint portions are arranged into multiple loops and mutually spaced in both a circumferential direction and a radial direction in the coil end group.

According to this arrangement, four or more electric conductors can be accommodated in a single slot without causing interference between the electric conductors at the coil ends. Especially, it becomes possible-to prevent the joint portions of the electric conductors from interfering with each other. Accordingly, the wiring turn number can be maintained satisfactorily and an improved output can be produced without losing the heat radiation ability at the coil end.

BRIEF DESCRIPTION OF THE DRAWINGS

FIG. 6 is a development showing a winding connection of the stator including slots #1 to #48.

FIGS. 6 and 7 are roundly connected at lines V—V and VI—VI.

FIGS. 15 and 16 are roundly connected at lines VII—VII and VIII—VIII.

FIGS. 20 and 21 are roundly connected at lines IX—IX and X—X.

DESCRIPTION OF THE PREFERRED EMBODIMENTS

An alternator for automotive vehicles will be explained hereinafter in accordance with each embodiment of the present invention with reference to the accompanied drawings.

Arrangement of First Embodiment

Figure 1:
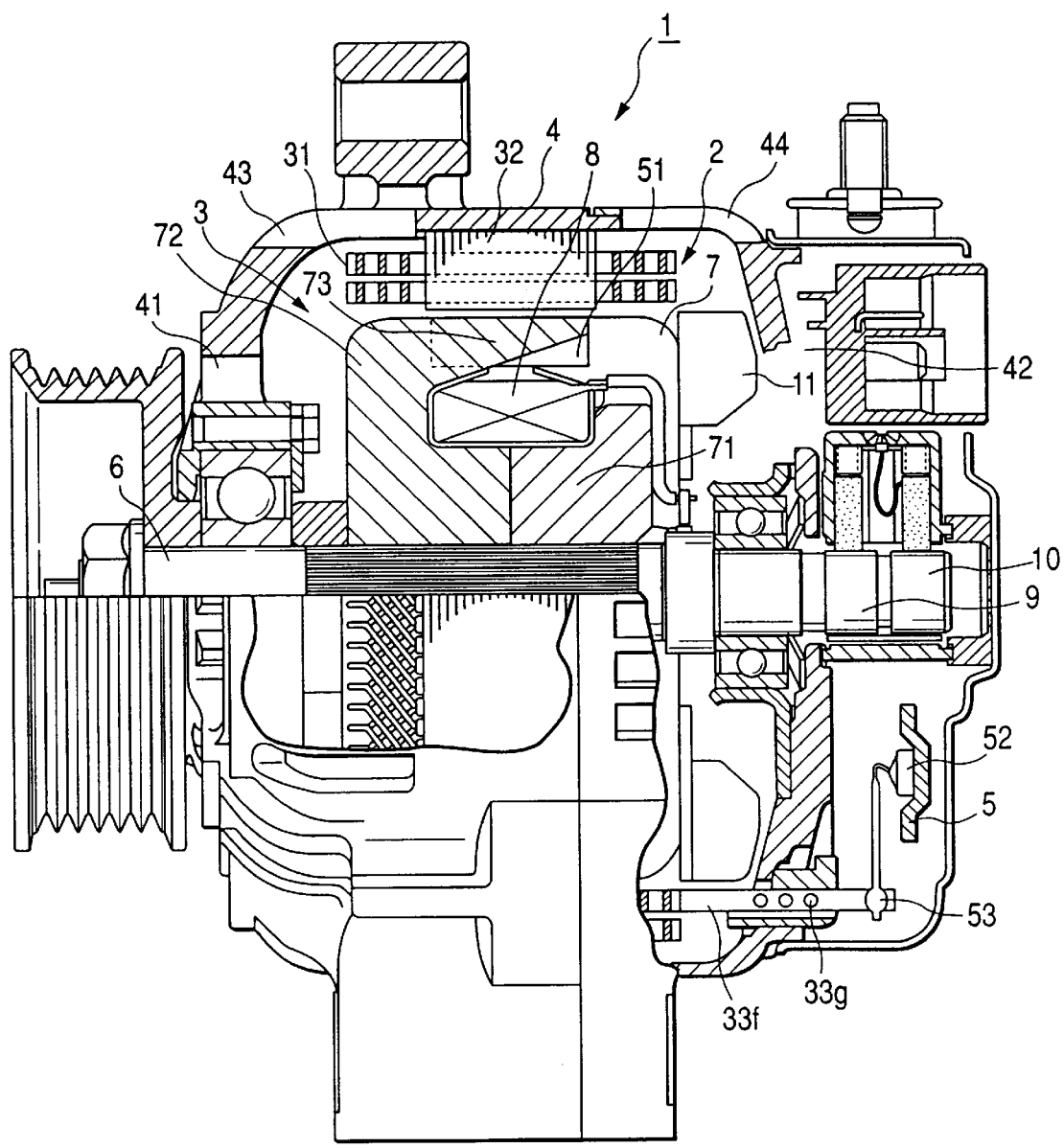
FIG. 1 is a vertical cross-sectional view showing a first embodiment of the present invention.
Figure 2:
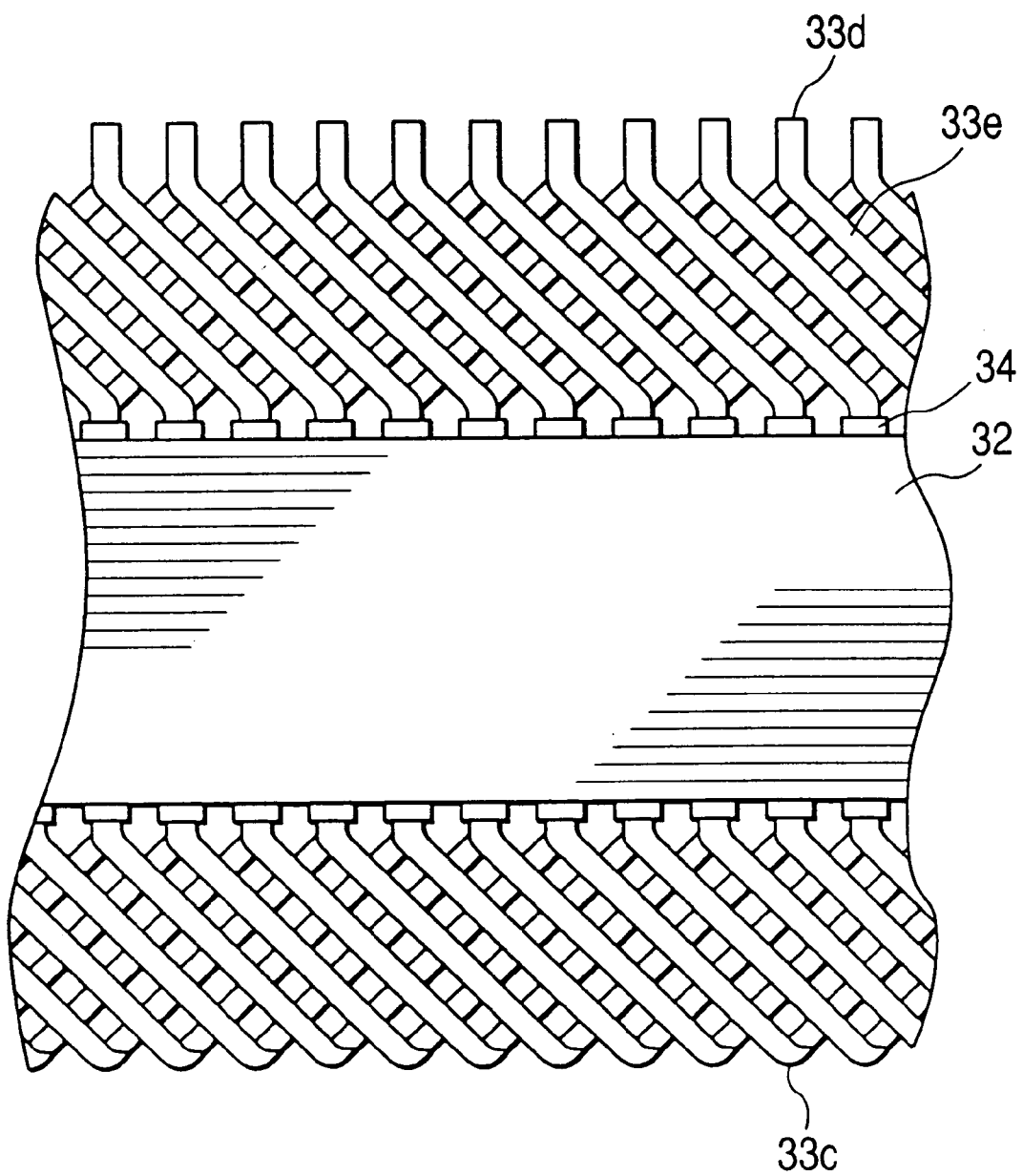
FIG. 2 is a view showing an appearance of a stator in accordance with the first embodiment of the present invention.

FIGS. 1 through 8 cooperatively show a first embodiment of the present invention. FIG. 1 is a view showing an essential structure of an automotive alternator which is preferably employed in an automotive vehicle. FIGS. 2 through 8 are views illustrating a stator in accordance with the first embodiment.

The automotive alternator 1 comprises a stator 2 serving as an armature, a rotor 3 serving as a field, a frame 4 supporting both the rotor 3 and the stator 2, and a rectifier 5 directly connected to the stator 2 for converting alternating-current power into direct-current power. An output of the rectifier 5 is connected to a battery of 12 V.

The rotor 3 integrally rotates together with a shaft 6. The rotor 3 comprises a pair of Lundel-type pole cores 7, a cooling fan 11, a field coil 8, slip rings 9 and 10, and a total of 16 permanent magnets 51. The permanent magnets 51 are connected to each other by a magnet holder (not shown).

Each permanent magnet 51 interposed between field cores is a ferrite magnet of a rectangular parallelopiped. The dimensions are 8 mm in the width between magnetic poles, 24 mm in the axial length, and 9 mm in the radial length. The field coil used for this alternator is a rectangular conductor having a resistance value of 1.8 Ω and a turn (T) number of 330 T. Furthermore, the permanent magnet 51 used for this alternator is a wet anisotropic magnet. This magnetic member can suppress the reduction in the magnetic property to within 5% when it is fully magnetized at a temperature of −30° C. or below.

The pole core 7 has a boss having a diameter of ⌀50 mm and a shaft 6 having a diameter of ⌀17 mm. A referential cross section is obtained by subtracting a cross section of the shaft 6 from a cross section of the boss portion of the pole core. This referential cross section is divided by the pole pair number. The resultant value is referred to as a reference value. In determining respective magnetic pole cross sections, the referential value is set to the same value.

The shaft 6 is connected to a pulley and driven by an engine (not shown) installed on an automotive vehicle for traveling.

The pole core 7 comprises a boss portion 71 assembled with the shaft 6, two disk portions 72 extending radially from both ends of the boss portion, and a total of 16 magnetic poles 73 disposed at a distal end of the disk portion 72.

The frame 4 has axial end portions where two inlet holes 41 and 42 are opened for introducing cooling air. Furthermore, the frame 4 has an outer peripheral portion where outlet holes 43 and 44 are opened for discharging the exhausted cooling air. The output holes 43 and 44 are arranged in two annular rows at portions facing the coil end 31. An outer diameter of the pulley is set to be larger than an outer diameter of the inlet hole 41 provided at the axial end surface of the frame 4.

The stator 2 comprises a stator core 32, conductor segments 33 constituting the stator winding, and insulators 34 electrically insulating the conductor segments 33. The stator 2 is supported by the frame 4. The stator core 32 is an assembly of laminated thin steel plates. A plurality of slots 35 are formed along its inner peripheral surface.

In each slot 35, two rectangular electric conductors are inserted as an inner-layer conductor and an outer-layer conductor. These electric conductors are constituted by conductor segments 33. Each conductor 33 is configured into a U-shaped or V-shaped body.

The stator winding is constituted by numerous conductor segments 33 electrically connected to one another. One end of the conductor segment 33 is formed into a turn portion 33c positioned at an axial side of the stator core 32, while the other end of the conductor segment 33 is formed into a joint portion 33d positioned at the other axial side of the stator core 32. The joint portion 33d is formed by connecting ends of different conductor segments 33. Thus, each conductor segment 33 protrudes from each side of the stator core 32 so as to form the coil end 31. As a result, a plurality of conductor segments 33 are disposed annularly on the stator core 32 so as to form an annular coil end group.

Each conductor segment 33 has a ridgeline portion 33e extending from the stator core 32. The ridgeline portions 33e are inclined in opposite directions in the outer and inner layers. A predetermined clearance is provided between adjacent conductor segments 33 at the axial sides of the stator to ensure sufficient electrical insulation.

The coil end 31 is opposed to the disk portion 72 of the pole core 7 of the rotor 3. An insulating film for each conductor segment 33 can be optionally provided.

Figure 4:
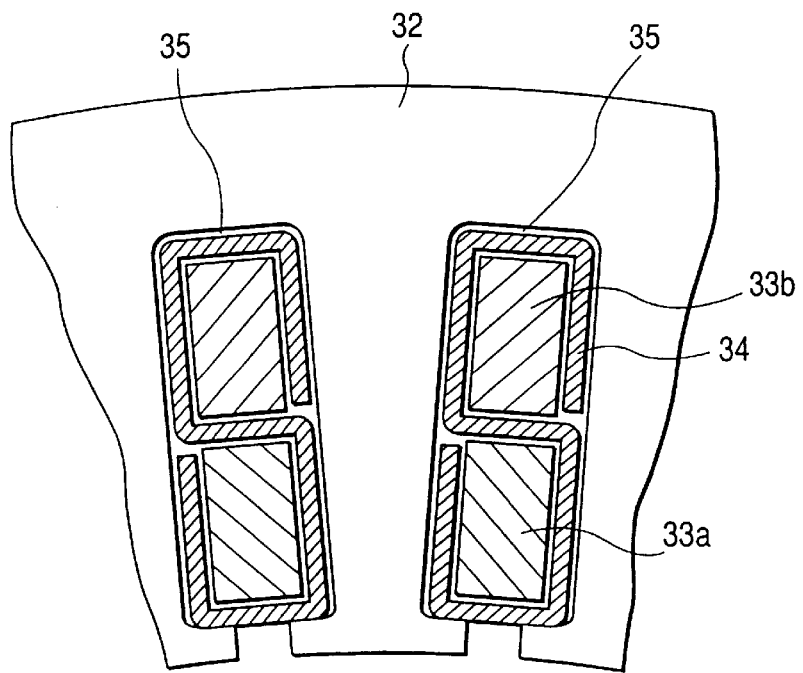
FIG. 4 is a cross-sectional view showing part of the stator in accordance with the first embodiment of the present invention.

The insulator 34, as shown in FIG. 4, has an S-shaped configuration to provide electrical insulation between the stator core 32 and the conductor segments 33 as well as between adjacent conductor segments 33 in each slot.

Each toothed front end portion of the stator core 32 is hardened during a machining process, such as a bending process, when the stator core 32 is manufactured or after the conductor segments 33 are inserted.

The above-described stator winding is a three-phase winding consisting of X, Y and Z phases. One winding end 33f of each phase extends in the axial direction and is directly and electrically connected to an electrode portion 53 of a rectifier element 52 of the rectifier 5 by fusing, welding, etc. The winding end 33f is provided with a portion 33g having a reduced cross section to absorb vibrations and realize a moderate transmission of a force.

Figure 22:
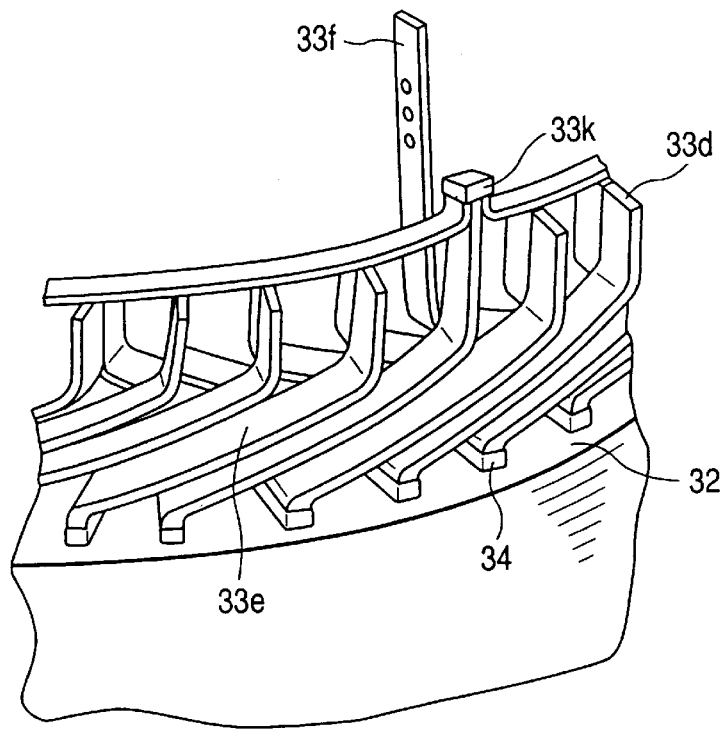
FIG. 22 is a perspective view showing a winding end of the stator in accordance with the first embodiment.

As shown in FIG. 22, the other end of each phase is electrically connected to a neutral point 33k of three phases directly or via a conductor.

Figure 3:
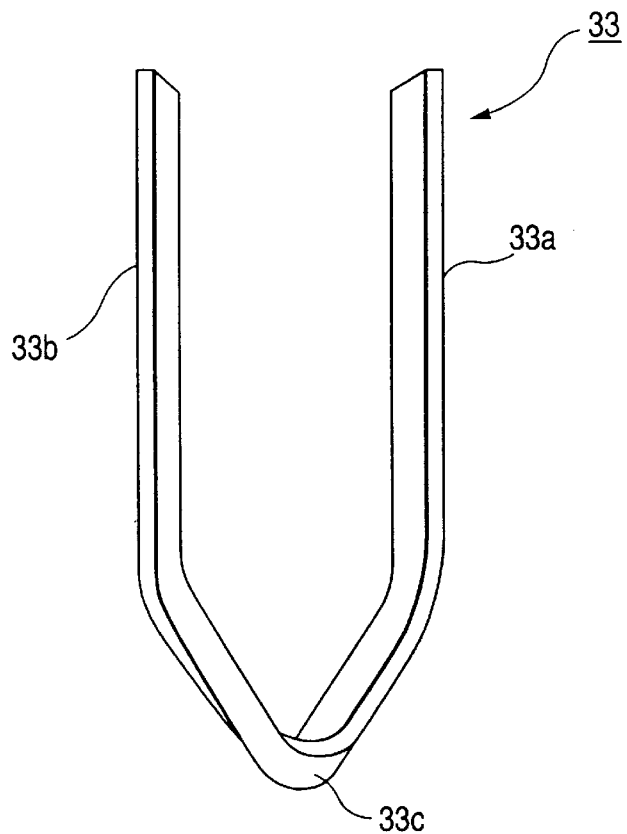
FIG. 3 is a perspective view showing a conductor segment 33 in accordance with the first embodiment of the present invention.

A manufacturing method for the stator winding is explained hereinafter. As shown in FIG. 3, each conductor segment 33 is configured into a U-shaped body having an inner-layer conductor portion 33a, an outer-layer conductor portion 33b, and a turn portion 33c. Each segment 33 is made of a copper plate which is bent and pressed into substantially a U-shaped configuration.

A plurality of conductor segments 33 are arrayed in such a manner that their turn portions 33c are positioned at the same axial side with respect to the stator core 32. As shown in FIG. 4, the outer-layer conductor portion 33b and the inner-layer conductor portion 33a are inserted into corresponding slots 35 and arrayed in the depth direction of is the slots 35. The outer-layer conductor portion 33b is positioned adjacent to a closed end of its slot, while the inner-layer conductor portion 33a is positioned adjacent to an opening of its slot. Each slot 35 has parallel side surfaces. Each electric conductor is press-fitted into the slot 35 in such a manner that both side surfaces of respective electric conductors confront with corresponding side surfaces of the slot 35 via the insulator 34.

Figure 5A:
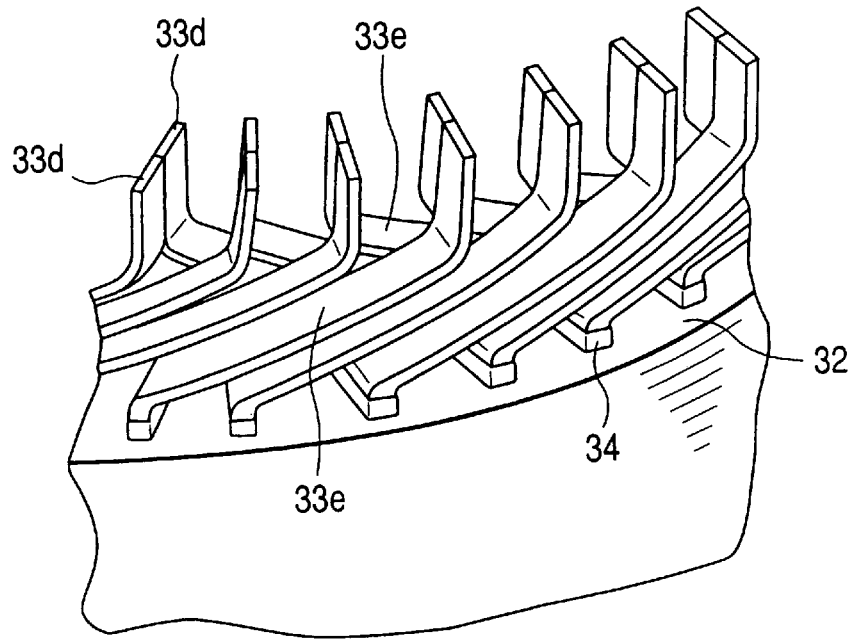
FIGS. 5(A) and 5(B) are perspective views showing respective coil ends located at respective ends of the stator in accordance with the first embodiment of the present invention.
Figure 5B:
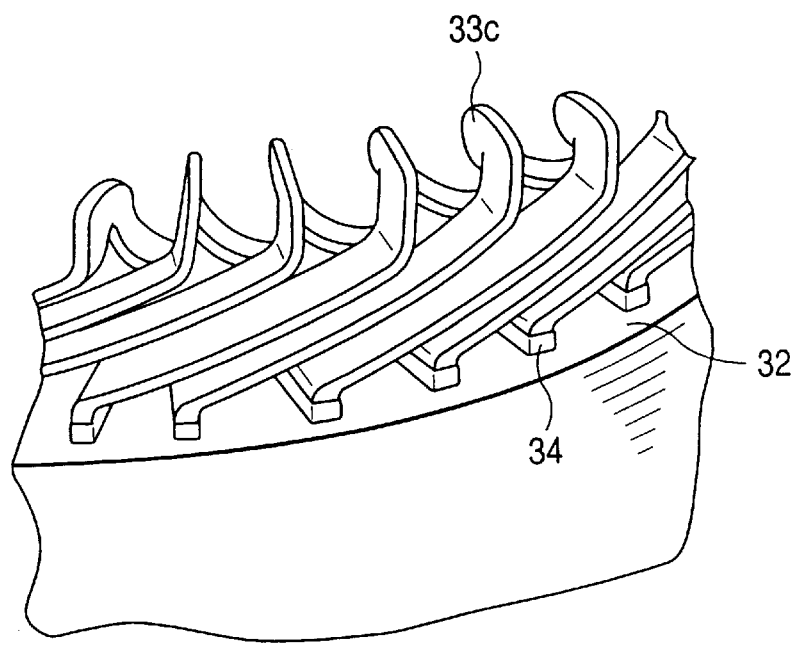

On the other hand, end portions of the plurality of conductor segments 33 are positioned at the other axial end of the stator core 32. These end portions constitute the projecting inner and outer layers. Thereafter, the inner and outer layers are bent in opposite directions in the circumferential direction as shown in FIGS. 5(A) and 5(B). The bent inner and outer layers correspond to a predetermined slot number. Ends of conductor segments 33 of different layers are then connected so as to constitute the joint portion 33d. To secure sufficient electric conduction, the joint portion 33d can be formed by ultrasonic welding, arc welding, brazing, etc.

In this embodiment, the rotor magnetic pole number is set to 16. The slot number of the stator core 32 is set to 96. The stator winding constitutes a three-phase winding.

The stator has an outer diameter of ⌀130 mm and an inner diameter of ⌀102 mm. The laminated thickness of the stator core 23 is 34 mm. The stator core 23 consists of numerous SPCC plate members each having a thickness of 0.5 mm stacked and fixed by laser welding, etc. The slots are provided at regular pitches of 3.75° corresponding to an electrical angle pitch of 30°. Each slot has a substantially rectangular shape having parallel side surfaces. The width between side surfaces is 1.8 mm. The depth is 10 mm. The back thickness is 3.5 mm. The opening width is 0.8 mm. The radial thickness of the toothed front end portion is lo set to 0.5 mm.

The size of the conductor inserted in the slot is 1.6 mm in thickness and 4.5 mm in width. A corner of the conductor is curved by a R of 0.6 mm or less. The insulator 34, having a thickness of approximately 100 µm, is interposed between the slot and each conductor.

Details of the wiring connection will be explained with reference to FIGS. 6, 7 and 8. Each crossover portion shown at the lower side of FIG. 6 or 7 corresponds to the segment turn portion 33c. The upper side corresponds to the joint portion 33d. In the drawings, a solid line represents the inner-layer conductor while an alternate long and short dash line represents the outer-layer conductor.

First, an X phase of the three-phase winding will be explained. A plurality of slots (designated by slot numbers #4, #10, #16, and so on through #94), arrayed at equal intervals of six slots from the starting slot #4, cooperatively constitute a first slot group. A plurality of neighboring slots (designated by slot numbers #5, #11, #17, and so on through #95), arrayed at equal intervals of six slots from the starting slot #5, cooperatively constitute a second slot group. A first winding is constituted by a plurality of conductor segments 33 accommodated in the first slot group. The first winding comprises two wavy winding portions. A second winding is constituted by a plurality of conductor segments 33 accommodated in the second slot group. The second winding comprises two wavy winding portions.

The first winding and the second winding are serially connected via two joint portions 102 and another joint portion 103. The two wavy winding portions of the second winding are reversed at the joint portion 103 and serially connected. At both ends, the wavy winding portions of the first winding are also serially connected via the joint portions 102, respectively. Two ends of the first winding are extracted as winding ends X and X', respectively.

The joint portion 102 connects an inner-layer electric conductor and an outer-layer electric conductor accommodated in two slots spaced at an interval of 5 slots. The joint portion 103 connects electric conductors of the same layer accommodated in two slots spaced at an interval of 6 slots.

As a result, the X phase is constituted by the first winding and the second winding which are serially connected and mutually phase shifted by a 30° electric angle. As the number of conductors per slot for the first winding is 2 T (turns) and for the second winding is 2 T, the resulting stator winding is 4 T. The remaining Y phase and Z phase are formed in the same manner, so as to constitute a start-connected winding arrangement of the three phases mutually phase shifted at electric angle pitches of 120°, as shown in FIG. 8.

According to the stator winding shown in FIGS. 5(A), 5(B), 6 and 7, the turn portions 33c of the conductor segments 33 are disposed at one end face of the stator core 32. The winding end 33f extends from the other end face of the stator core 32 and is connected to the rectifier 5.

Function and Effect of Embodiment

According to the above-described arrangement, the ridgeline portions 33e of the plurality of inner-layer conductor segments 33 are inclined in the same direction. The ridgeline portions 33e of the plurality of outer-layer conductor segments 33 are inclined in the same direction. This is advantageous in that the multi-phase stator winding can be arranged without causing any interference at the coil end. Thus, a space factor of the electric conductor in each slot can be improved, which leads to a higher output. An appropriate clearance is provided between neighboring conductors at the coil end for assuring electric insulation between the conductors. Provision of such a clearance makes it possible to greatly suppress the temperature increase. Especially, an internal fan 11 is provided at an axial end of a Lundel-type rotor. The outlet holes 43 and 44, each serving as a ventilation hole, are provided on the frame 4 so as to oppose an outer peripheral side of the coil end 31. This arrangement brings an extreme reduction in the flow resistance of the cooling air. Thus, the cooling air can smoothly pass through the coil end and reach the outer peripheral portion of the frame. The cooling ability can be greatly improved.

Furthermore, adjacent slots can be serially connected for the stator winding. This reduces the number of conductors per slot, making it easy to secure an adequate clearance between conductors at the coil end. Furthermore, it is easy to obtain the T number required for an automotive alternator.

The number of slots is three times the pole number of the rotor when the stator is designed according to a conventional winding method. In this case, none of possible winding methods makes it possible to obtain a T number exceeding the number of electric conductors in a slot. In general, automotive alternators have a rated power output of 0.5 to 2.5 kW. When this power output is required at a minimum engine rotation rate, the T number of the stator must be at least 3 T for an alternator of a predetermined physical size installable in an automotive vehicle.

Figure 9:
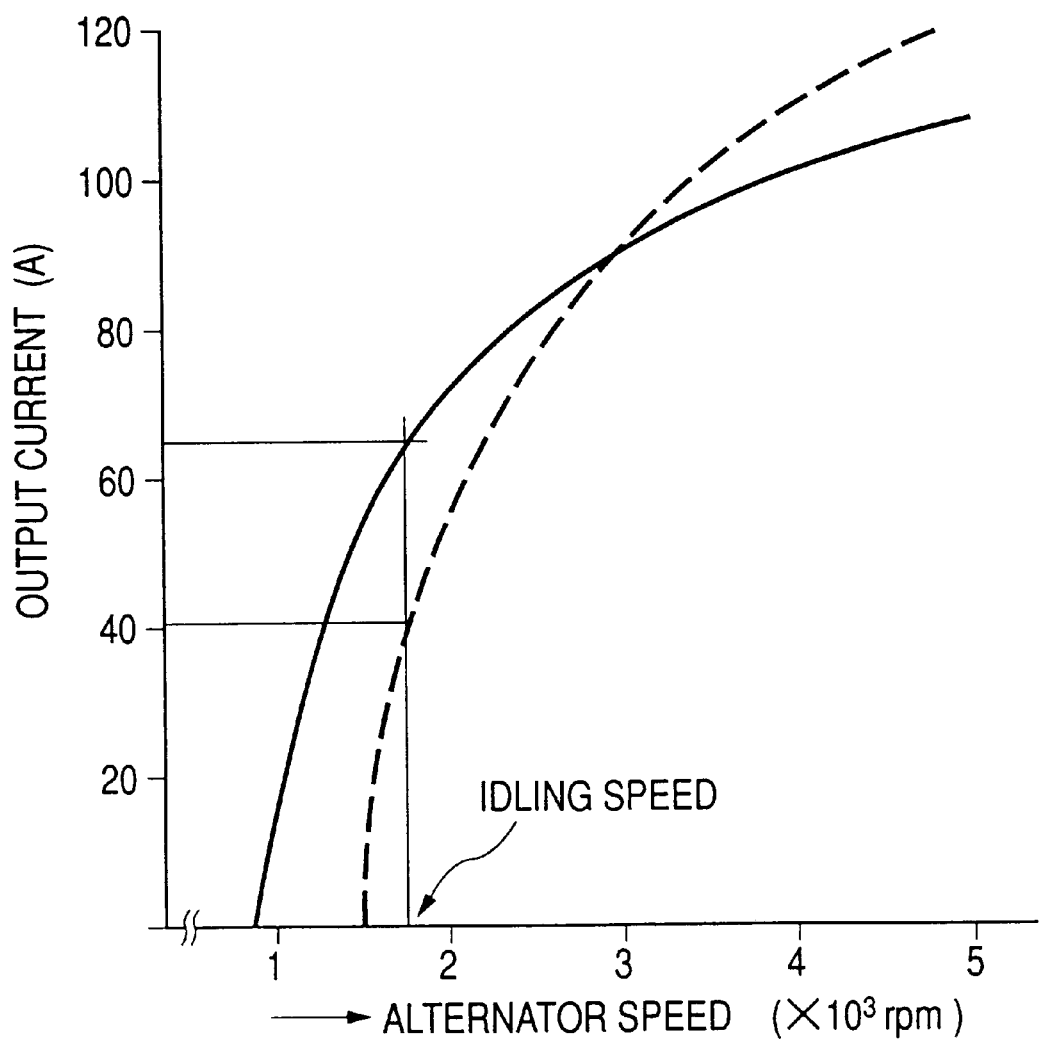
FIG. 9 is a graph showing an output performance of the alternator for an automotive vehicle.

If a designed stator T number is smaller than this value, no power output will be obtained in a low-speed region as indicated by a dotted line in FIG. 9, while a higher power output will be obtained in a limited range of a high-speed region. Such output characteristics are not suitable for an automotive alternator.

For example, according to the conventional winding method, the slot number is three times the pole number. It is assumed that the conductor number per slot is two and the T number of the stator winding is 2 T. A solid line shown in FIG. 9 represents a power output characteristic of the present embodiment in comparison with the dotted line representing the conventional power output characteristic. As is apparent from the graph, the conventional power output characteristic is disadvantageous in that the power output is considerably lowered in the range of idling rotations which is frequently used during the driving operation of automotive vehicles. Thus, the conventional power output characteristic is not appropriate for an automotive alternator. Thus, the conductor number per slot must be increased, which will significantly reduce the clearance between neighboring conductors at the coil end when each conductor has the same cross-sectional area. The cooling ability of the cooling air is worsened. As the space factor in each slot is increased, more man-hours are needed in assembling the conductors to the stator core, which will increase the manufacturing costs. It may be possible to increase the T number by reducing the cross section of each conductor. However, this will result in a serious reduction in the power output due to an increase in the impedance of the winding.

On the other hand, according to the present embodiment, the slot number is equal to or more than three times the pole number and some of the conductors of adjacent slots are serially connected. Thus, the conductor number per slot can be minimized to two which is a minimum value. This arrangement effectively provides sufficient clearances at the coil end, thus allowing a satisfactory amount of cooling air to pass the coil end. The space factor in each slot can be improved without increasing the manufacturing costs. An output required for an automotive vehicle can be obtained even in a low-speed region.

Furthermore, according to the above-described embodiment, first and second windings are serially connected with a phase difference equivalent to an electric angle of 30°. This arrangement is advantageous in that a magnetomotive pulsation force can be reduced, which will greatly reduce the magnetic noise.

Figure 7:
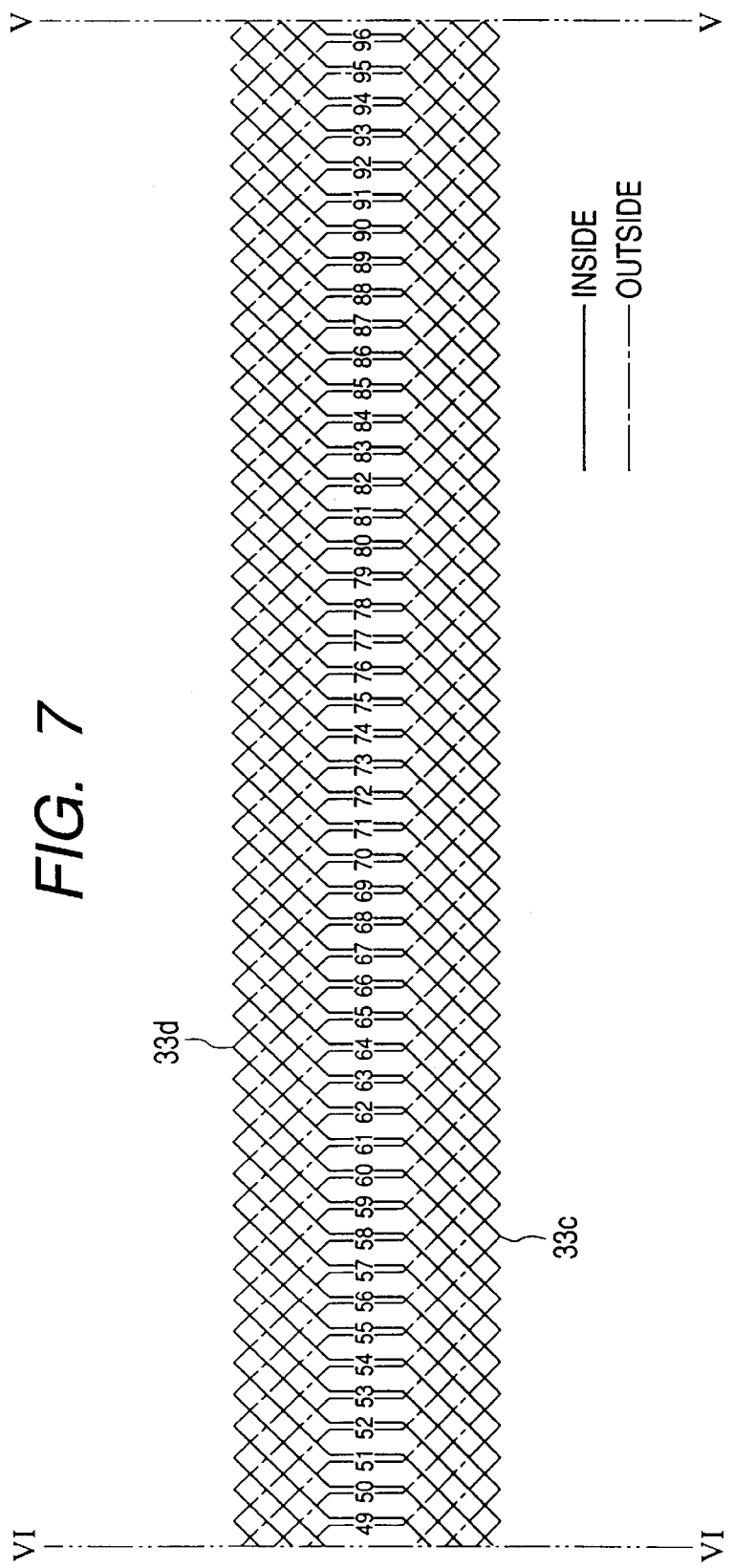
FIG. 7 is a development showing a winding connection of the stator including slots #49 to #96, where a series of stator windings is formed when
Figure 8:
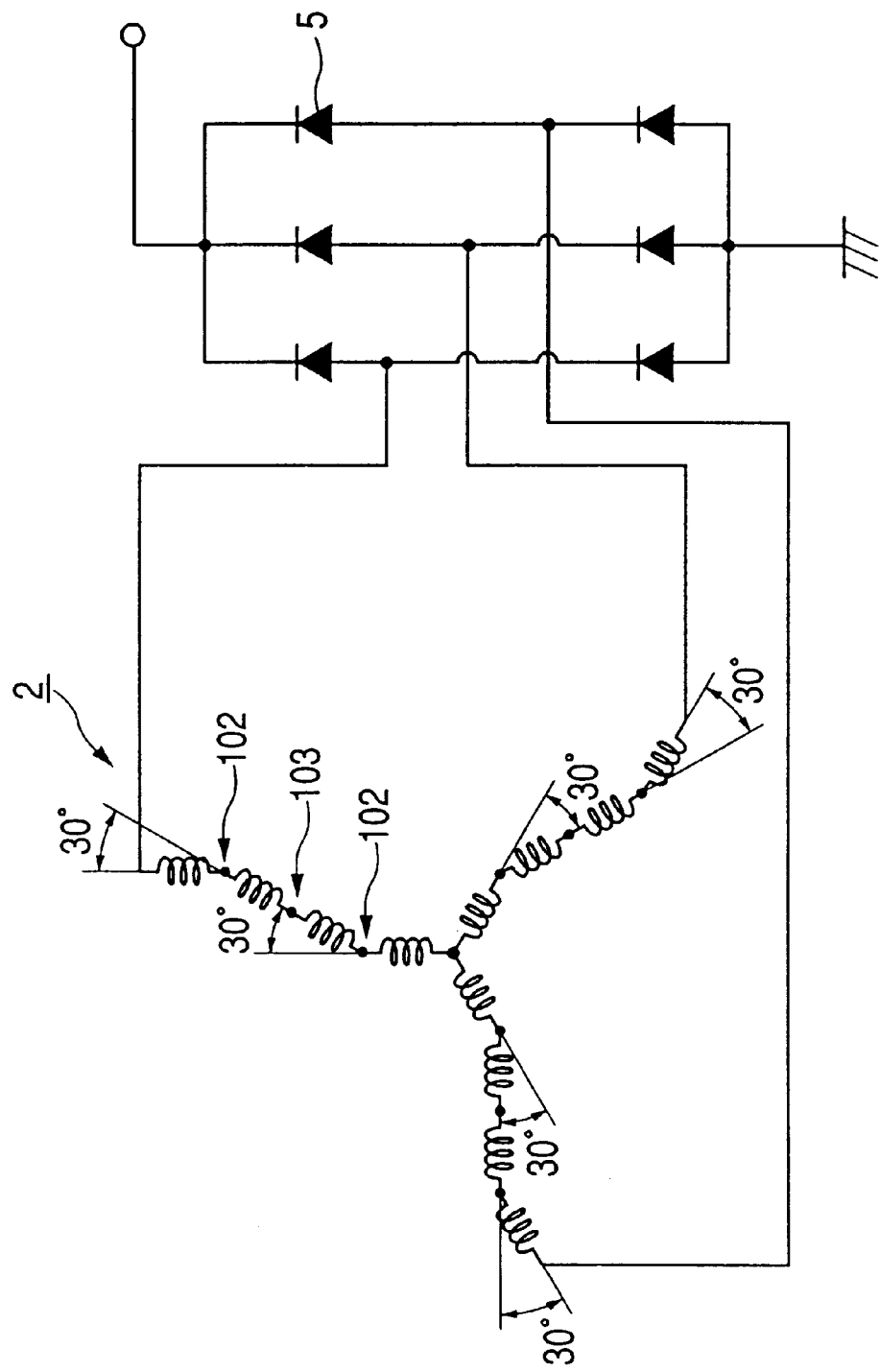
FIG. 8 is a circuit diagram showing an alternator for an automotive vehicle.

Furthermore, according to the winding connection shown in FIGS. 6 and 7, the inner-layer conductor and the outer-layer conductor are arranged in a two-layer construction and alternately connected. As a result, the length of the crossover portion is the same in each phase, which equalizes the electric resistance values of the different phase windings. In addition, as conventionally known, the inductance of the stator winding is differentiated depending on the position in the slot. According to the above-described embodiment, the position of the inner-layer conductors and the outer-layer conductors is the same in each slot. Thus, the inductance can be unified in each slot, and the local heat generation can be eliminated.

The coil end height can be reduced remarkably. As a result, the resistance value can be reduced to approximately one half as compared to a conventional stator winding. This makes it possible to reduce the impedance, realizing both compactness and high power. Due to suppression of heat generation, temperature is reduced and high efficiency can be attained.

Furthermore, the reduction of the coil end height results in a reduced axial length of the stator 2. As a result, a round corner of the frame can be enlarged,, and it becomes possible to provide a round automotive alternator. This shape can improve the mechanical rigidity and is effective to reduce the possibility of causing any interference with other components when the alternator is installed in an automotive vehicle.

Furthermore, the cooling ability can be greatly improved at the coil end, which allows a downsizing of the fan. Furthermore, according to the arrangement of the above-described coil end portion, the surface roughness can be smoothed and a uniform repetitive pattern can be formed. Also, the coil end portion allows the cooling air to pass inside it. Thus, the fan noise caused by the cooling air can be greatly reduced.

Furthermore, the winding end 33f extends from a side opposed to the turn portion 33c of the conductor segment 33. Thus, the turn portions 33c are formed into the same configuration, and the straight portion other than the turn portion 33c of each segment can be flexibly changed in length for a connection of the winding end 33f or for a connection between the joint portions 102 and 103. In other words, the only thing required in the manufacturing of the conductor segments 33 is to change the lengths of the straight portions. This greatly reduces the production man-hours, and the cost for the manufacturing facility can also be reduced.

Moreover, the formation of the conductor into a rectangular shape realizes a high space factor. The conductor segment can be fabricated by using a press machine, etc., which significantly reduces the material and machining costs. Furthermore, due to an increase of a confronting area between the electric conductors and the stator core, improved heat transfer is realized between the electric conductors and the stator core.

Accordingly, the temperature of each electric conductor can be further reduced. The overall rigidity of the stator is increased. As a result, magnetic noise can be reduced. Furthermore, due to the rigidity of each electric conductor, maintaining a controlled clearance between the coils is easily done. This makes it possible to eliminate an insulating film for each conductor, as well as removal of a fixing member for the conductors. Accordingly, it becomes possible to provide an alternator excellent in reliability and low in cost. Furthermore, improvement of the rigidity at the winding end portion may abolish a conventionally used terminal base for the rectifier. Therefore, it becomes possible to directly connect it to the rectifier element 52 and thereby to reduce costs.

The two inner and outer layers are accommodated in each slot by using a single electric conductor, which simplifies the installation. A wire connecting portion is provided at only one portion in the radial direction, without causing overlap with any other wire connecting portion. This is effective to simplify the welding etc. operation, and productivity can be improved. In other words, it becomes possible to provide an alternator at a low cost. As only one set of rectifiers is arranged, electric components can be simplified, which contributes to the cost reduction.

Furthermore, an iron member can be used for the cooling fan of the Lundel-type rotor. This improves the durability under high-speed conditions as compared with that of a salient rotor. According to the salient rotor, magnetic poles are disposed on an axial end face. A member provided at the axial end face must be a non-magnetic material, such as aluminum or a resin, for preventing short-circuit of the magnetic flux. Due to excellent durability in a high-speed region, a pulley ratio can be improved so as to increase the rotational speed of the rotor in an idling condition and improve the output. Furthermore, material or machining costs for a fan can be reduced. Furthermore, a cheaper fusing welding can be adopted as a means for connecting the pole core, which is effective to reduce manufacturing costs.

Second Embodiment

Figure 10:
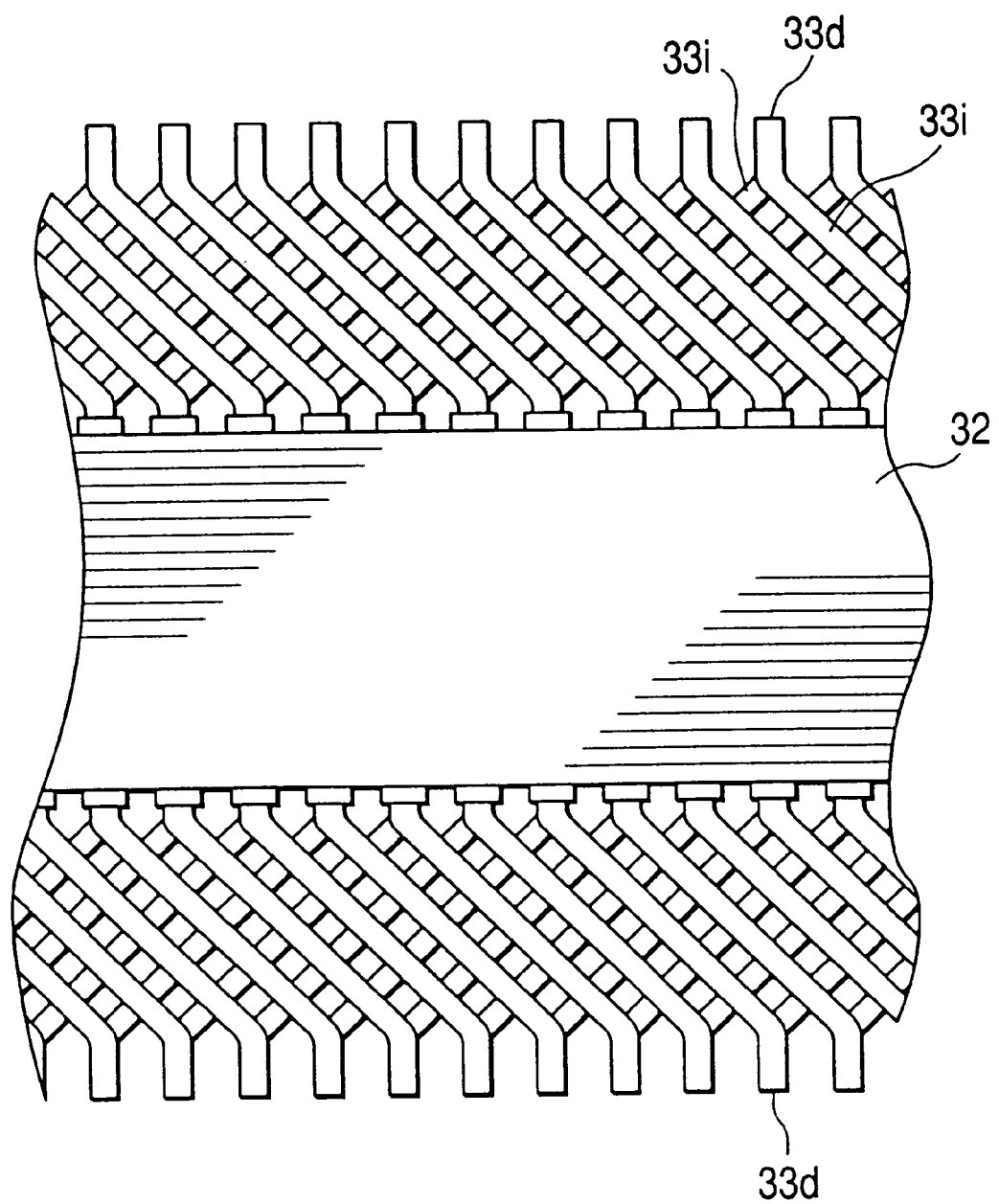
FIG. 10 is a view showing a partial appearance of a stator in accordance with a second embodiment.
Figure 11:
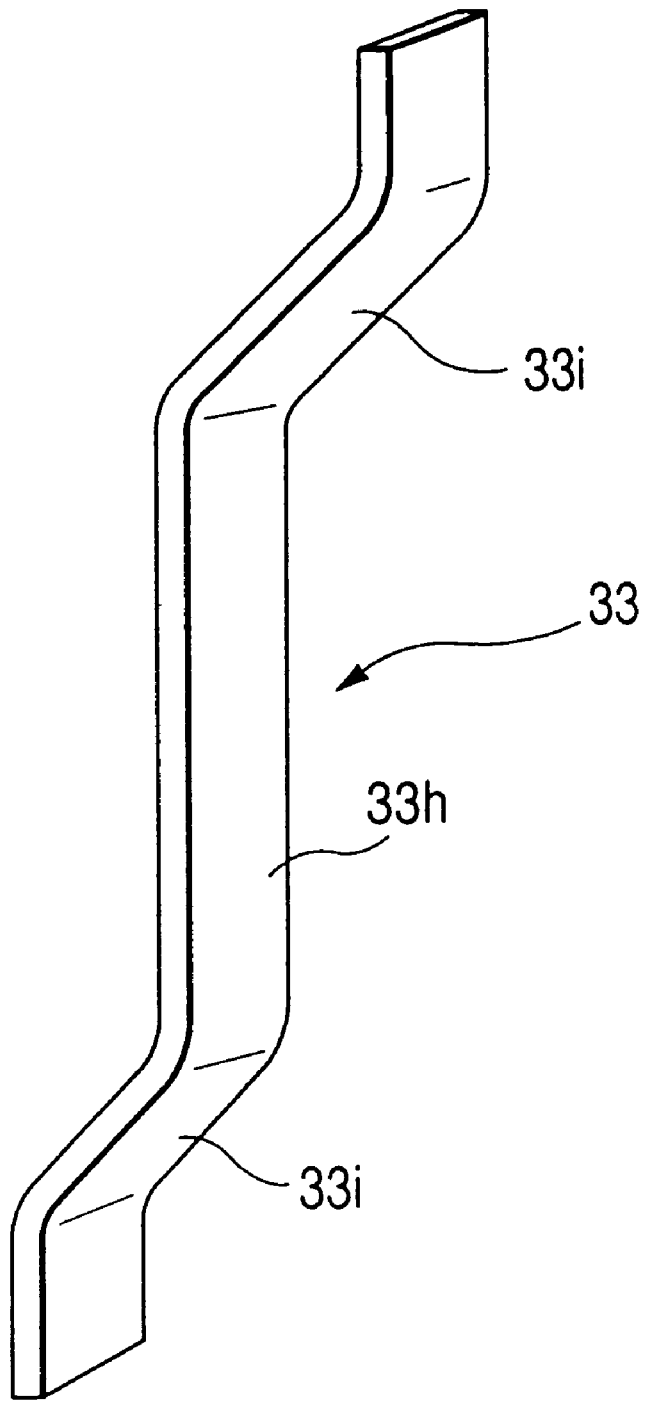
FIG. 11 is a perspective view showing a conductor segment 33 in accordance with the second embodiment of the present invention.

FIGS. 10 to 12 cooperatively show a second embodiment. The turn portion 33c of the conductor segment 33, shown in the first embodiment, is provided at one axial side surface of the stator core 2. However, according to the second embodiment, the conductor segment is separated into two conductor segments without providing the turn portion 33c. Thus, the joint portions are provided at both axial sides of the stator core 32.

Figure 12A:
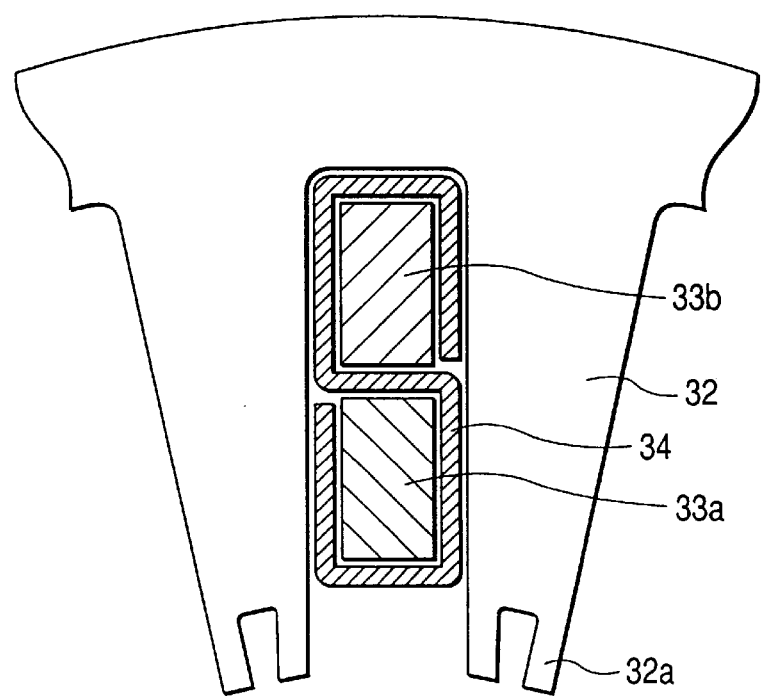
FIGS. 12(A) and 12(B) are cross-sectional views showing part of the stator in accordance with the second embodiment of the present invention.
Figure 12B:
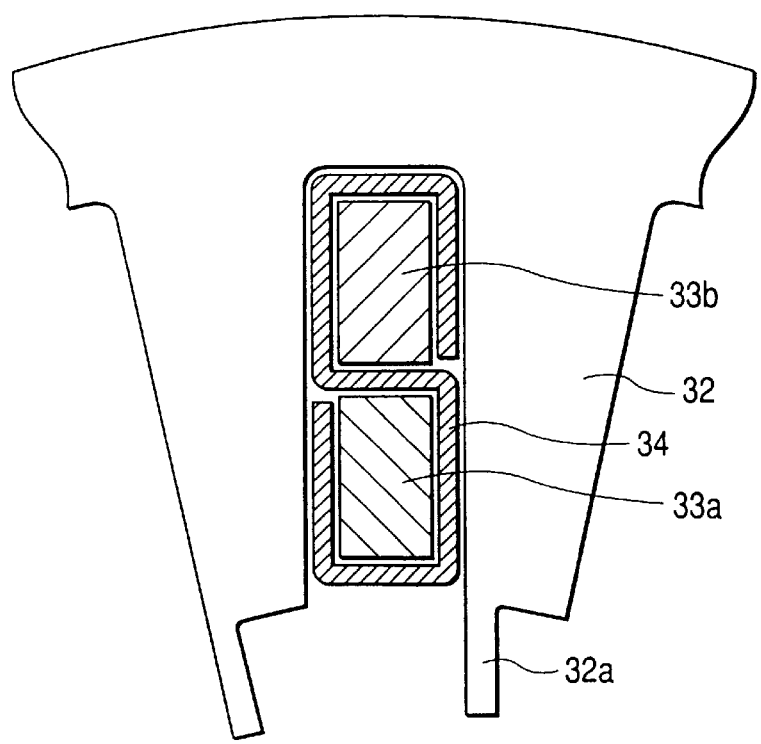

As shown in FIG. 11, the conductor segment 33 comprises an internal conductor 33h serving as a straight portion inserted in the slot and external conductors 33i serving as straight portions that extend from the both ends of the internal conductor in the axial direction of the stator core 32. The external conductor 33i has an angle and a length for spanning a distance equivalent to approximately one half of a N-and-S magnetic pole pitch. Each external conductor 33i constitutes the ridgeline portion of the coil end 31 as shown in FIG. 10. A plurality of conductor segments 33 are inserted in the corresponding slots so that the ridgeline portions 33i of the inner and outer layers are inclined in opposed directions. The stator core 32 is shown in FIGS. 12(A) or 12(B) of FIG. 12. Each toothed core end 32a is formed into an U-shaped or J-shaped configuration. After a plurality of conductor segments 33 are inserted in a corresponding slot, each toothed core end 32a is deformed plastically, for example, by pushing it in the radial direction using a machining tool so as to close the slot opening formed at an inner periphery of the slot. With this arrangement, it becomes possible to insert the conductor segments 33 from the radially inward direction. The processing of the conductor segments can be performed beforehand, which simplifies the installation.

Furthermore, after the conductor segments are inserted in the slot, it is possible to deform the conductor segments by depressing the conductor segments from the radially inward direction so that the conductor segments fit to the configuration of the slot. This is effective to realize a high space factor. Moreover, the toothed core end is hardened through the plastic deformation. This is effective to prevent the toothed core end from being deformed by the springback of the conductor segment 33. Although the present embodiment processes the conductor segment 33 beforehand, it is possible to perform the bending operation upon the conductor segment 33 after it is inserted in the slot.

Third Embodiment

Figure 13:
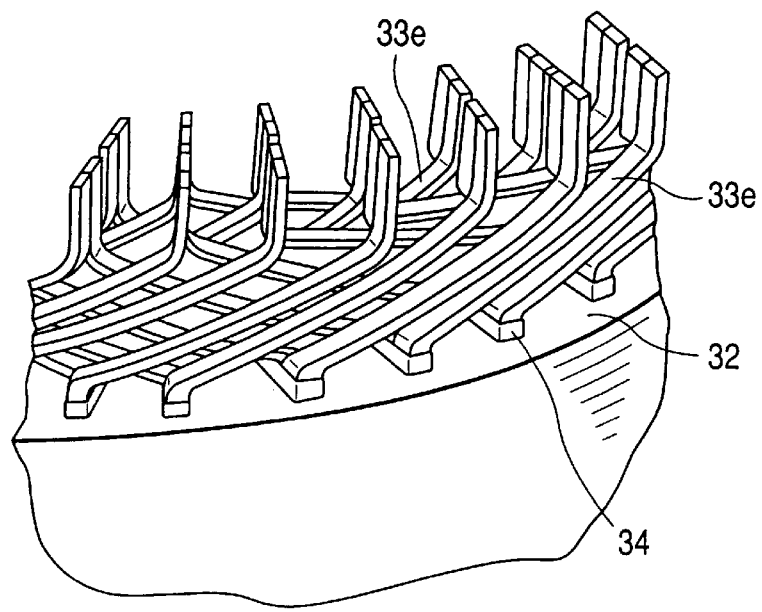
FIG. 13 is a perspective view showing the coil end of a stator in accordance with a third embodiment of the present invention.

The above-described first and second embodiments have a pair of inner-layer and outer-layer electric conductors. That is, the electric conductor number in each slot is 2 T. However, it is possible to provide electric conductors of two pairs or more by repeating the above-described insertion process of the conductor segments. In this case, as shown in FIG. 13, the interference between the different phases at the coil end portions can be avoided in the same manner as in the first embodiment. Thus, a higher space factor, improved cooling efficiency and noise reduction can be attained in the same manner as in the above-described embodiments. Furthermore, the electric conductor number per slot is increased. This is advantageous in that even when the engine is operated in a lower-speed region, a sufficient amount of electric power is generated. Thus, it becomes possible to increase the generated power output amount at the lower-speed region.

Figure 14:
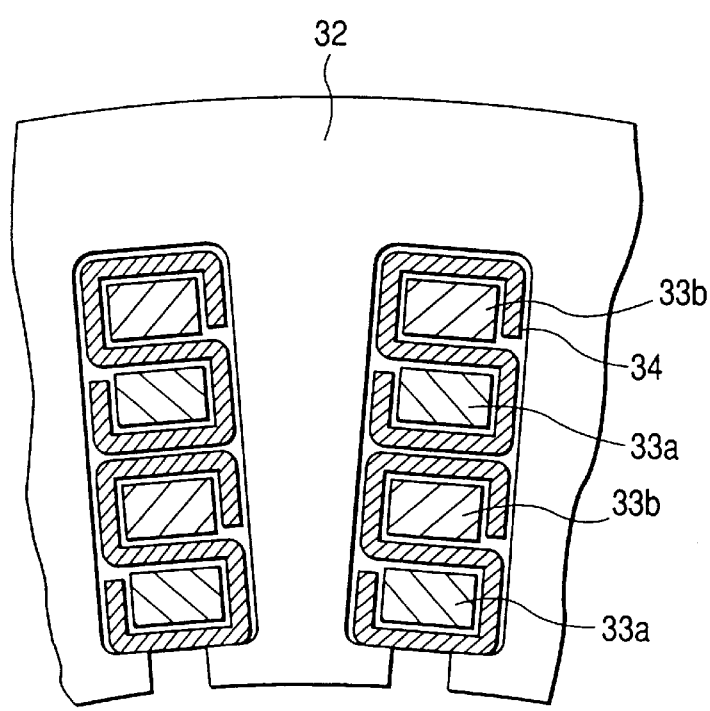
FIG. 14 is a cross-sectional view showing part of the stator in accordance with the third embodiment of the present invention.

FIG. 14 shows an insulator which is configured for the two pairs of inner-layer and outer-layer electric conductors, i.e., corresponding to a conductor number per slot of 4 T.

Furthermore, when the inner-layer and outer-layer electric conductors of two pairs or more are provided, the T number is arbitrarily realized by changing the settings for the slot number, wire connecting portions, etc.

Fourth Embodiment

According to the above-described first to third embodiments, the windings of slot groups mutually phase shifted by a 30° electric angle are connected in series to increase the T number per slot. This is also effective in view of noise reduction, because the 6-times order components of the pole pair number, serving as main components of the magnetic noise, can be canceled. In short, a summed-up AC output is generated from these two windings.

Figure 15:
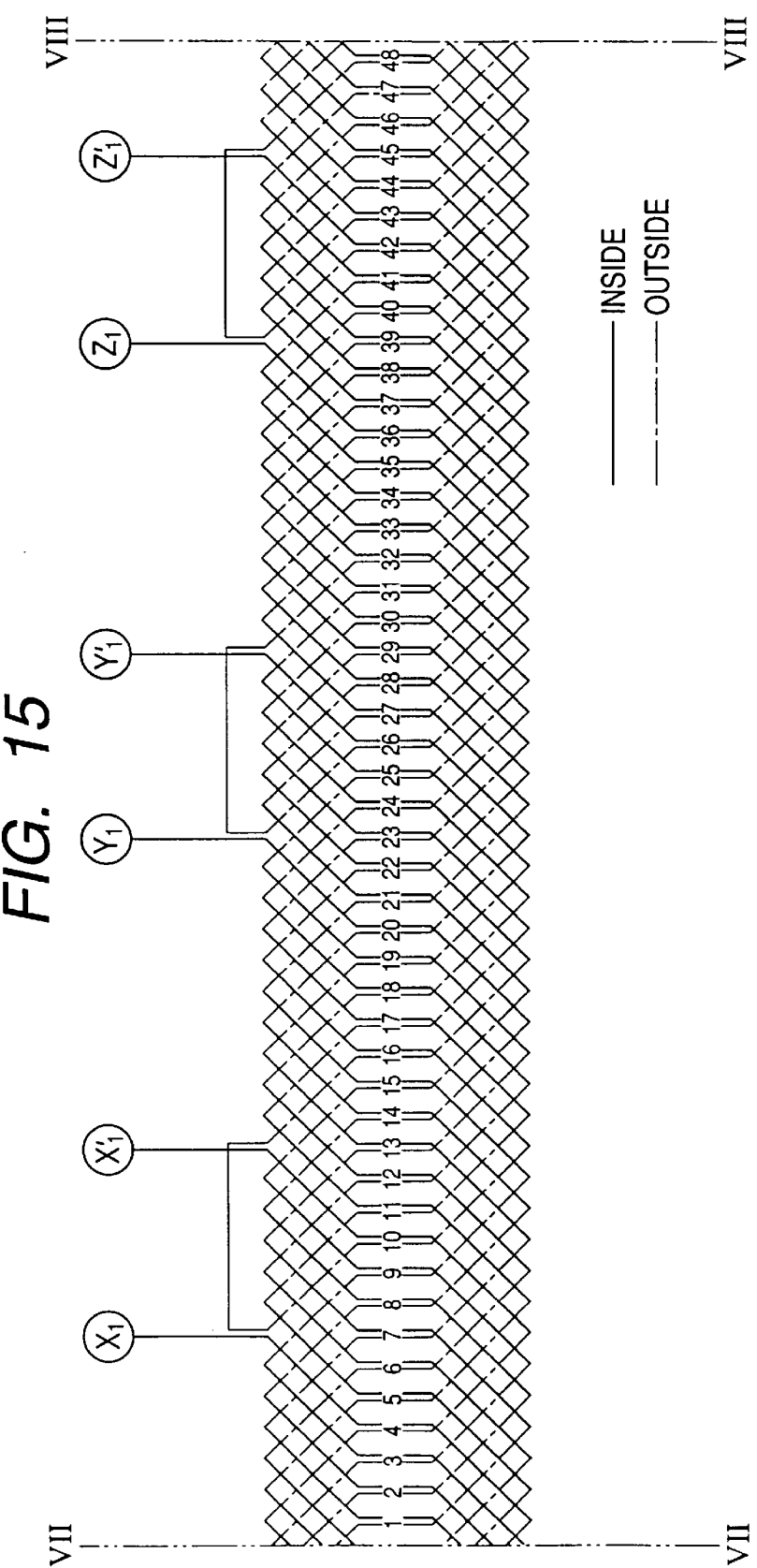
FIGS. 15 and 16 are developments cooperatively showing a winding connection of the stator in accordance with a fourth embodiment of the present invention, where a series of stator windings is formed when
Figure 16:
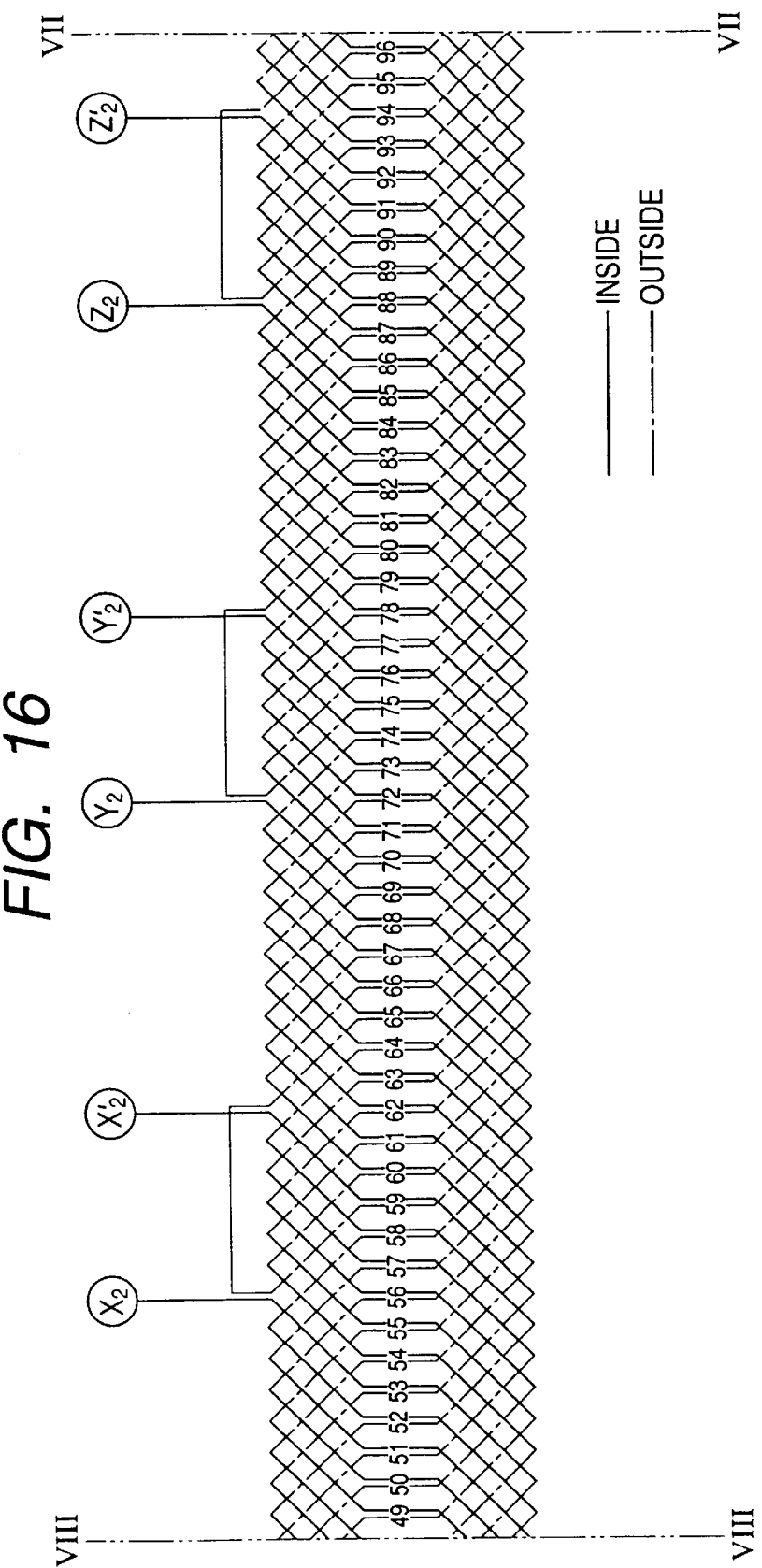
Figure 17:
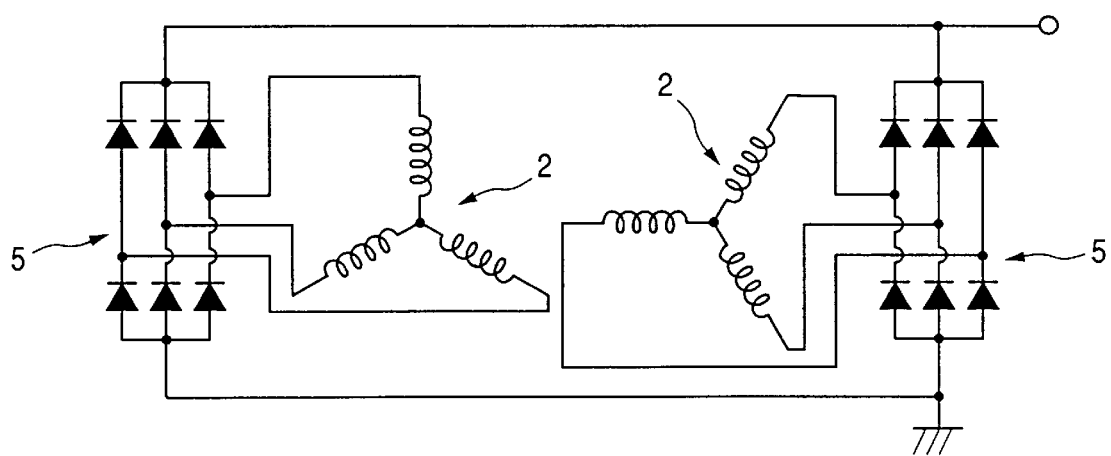
FIG. 17 is a circuit diagram showing an alternator for an automotive vehicle in accordance with the fourth embodiment of the present invention.

On the other hand, FIGS. 15 and 16 are developments showing the stator winding of the fourth embodiment. FIG. 17 shows a circuit diagram of the fourth embodiment. The outputs of two sets of three-phase windings mutually phase shifted by a 30° electric angle are rectified, and the rectified outputs are combined to generate a summed-up DC output.

Details of the wiring connection will be explained with reference to FIGS. 15, 16 and 17. Each crossover portion shown at the lower side of FIG. 15 or 16 corresponds to the segment turn portion 33c. The upper side corresponds to the joint portion 33d. In the drawings, a solid line represents the inner-layer conductor while an alternate long and short dash line represents the outer-layer conductor.

First, the first and second windings of an X phase will be explained. A plurality of slots (designated by slot numbers #4, #10, #16, and so on through #94), arrayed at equal intervals of six slots from starting slot #4, cooperatively constitute a first slot group. A plurality of neighboring slots (designated by slot numbers #5, #11, #17, and so on through #95), arrayed at equal intervals of six slots from the starting slot #5, cooperatively constitute a second slot group.

The first winding extends throughout the first conductor group from a winding end X1 to another winding end X1'. The first winding comprises two wavy winding portions serially connected at an inversion joint portion interposed between the winding ends X1 and X1' shown in FIG. 15. The second winding extends throughout the second conductor group from a winding end X2 to another winding end X2' shown in FIG. 16. The second winding is arranged in the same manner as the first winding.

Furthermore, the Y phase and Z phase are formed in the same manner at intervals of 120° electric angle pitches, so as to form the first and second windings in each phase.

FIG. 17 shows a winding arrangement connecting these six windings. A total of three, i.e., X-, Y- and Z-phase, first windings are connected to constitute a star-connected winding arrangement, and are connected to a first rectifier. A total of three, i.e., X-, Y- and Z-phase, second windings are connected to constitute a star-connected winding arrangement, and are connected to a second rectifier. The first and second rectifiers produce DC outputs which are summed up.

With this arrangement, it becomes possible to produce a summed-up DC output from 2 T three-phase windings. This may improve the power shortage in the engine low-rotational region. If the fourth embodiment is combined with the above-described third embodiment which comprises the inner-layer and outer-layer electric conductors of two pairs or more, the T number per slot can be increased to 4 T or more, which solves the generated power shortage in the low-rotational region. Moreover, this arrangement is advantageous in that the serial connection of mutually phase shifted windings is no longer required. This makes it possible to equalize the configuration of the conductor segments. The production efficiency in the manufacturing of the conductor segments can be further improved. Needless to say, it is possible to cancel the 6-times order components of the pole pair number serving as main components of the magnetic noise.

Other Embodiments

According to the above-described first embodiment, the conductor segments are connected at only one axial side surface of the stator 2. It is possible to connect the conductor segments at both axial sides of the stator 2. For example, the turn portions of a plurality of conductor segments can be separately provided at both axial end portions of the stator core 32. In this case, the joint pitch can be widened and the connecting process, such as the welding operation, can be simplified.

The stator core 32 shown in FIGS. 12(A) and 12(B) employed in the second embodiment can be combined with the conductor segments 33 shown in FIG. 3 employed in the first embodiment.

When the stator core 32 shown in FIGS. 12(A) and 12(B) is used, the conductor segments are inserted into corresponding slots and then the slots are successively plastically deformed so as to improve the production efficiency remarkably.

The electric conductor may be a rectangular conductor consisting of a plurality of wires.

The above-described embodiments use electric conductors made of copper. However, it is possible to use aluminum or iron conductors. When these materials are used, the material costs can be reduced. The production process can be simplified by using molding or die casting.

The rectangular electric conductors used in the above-described embodiments can be replaced by round electric conductors. It is also possible to use complex conductors comprising both a rectangular conductor portion and a round conductor portion. For example, the rectangular conductor portion may be disposed in the slot while the round conductor portion may be disposed outside the slot. This arrangement is advantageous in that the space factor in the slot can be increased and the cooling ability can be increased. On the contrary, the round conductor portion may be disposed in the slot while the rectangular conductor portion may be disposed outside the slot. This arrangement is advantageous in that a sufficient clearance can be provided between electric conductors at the coil end. The flow resistance of the cooling air is reduced, and the cooling ability can be improved greatly. Preferably, the rectangular electric conductor may have a flattened cross section.

It is preferable to cover each conductor segment 33 by an insulating film, so that a U-shaped insulator is disposed along the inner wall of the slot. In this case, the insulator configuration is simplified. It is further possible to eliminate the insulator by applying appropriate insulation processing to the stator core 32. In this case, it becomes possible to avoid insulation defects due to dislocation of the insulator during the insertion of each conductor segment 33 into the slot.

The stator winding may be a multi-phase winding having more than three phases. Even in the multi-phase winding, the winding of the stator core 32 can be formed regularly. The winding structure is not complicated. Having more than three phases is effective to reduce the noise and the ripple of rectified voltage.

The stator winding can be constituted by a triangular winding arrangement. The winding type should be determined properly according to a required performance of the generated power for an automotive vehicle.

It is possible to use a rotor having no magnet, or a rotor having only magnetization by a magnet.

Figure 18:
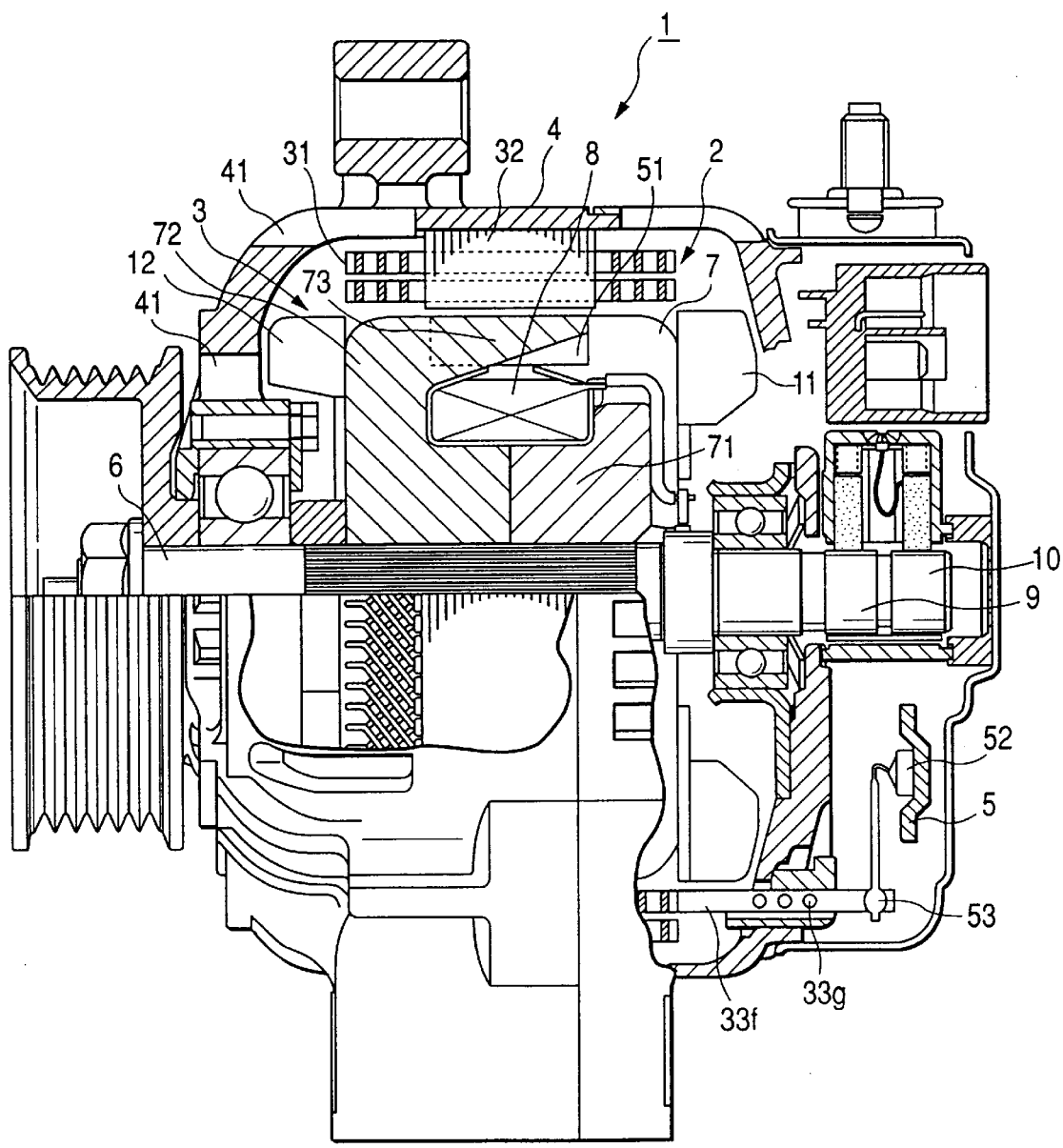
FIGS. 18 and 19 are vertical cross-sectional views showing other embodiments of the present invention.

It is possible to provide cooling fans at both end faces of the rotor, as shown in FIG. 18. According to this arrangement, another cooling fan 12 is provided at a front end side of the rotor. This arrangement improves the cooling characteristics. According to the Lundel-type rotor causing air flow at a disk portion of the pole core, a satisfactory cooling ability can be attained by using only one cooling fan 11 shown in FIG. 1. However, providing the cooling fans at both ends of the rotor is effective to increase the cooling ability and reduce the size of the automotive alternator when the same power output is demanded.

Figure 19:
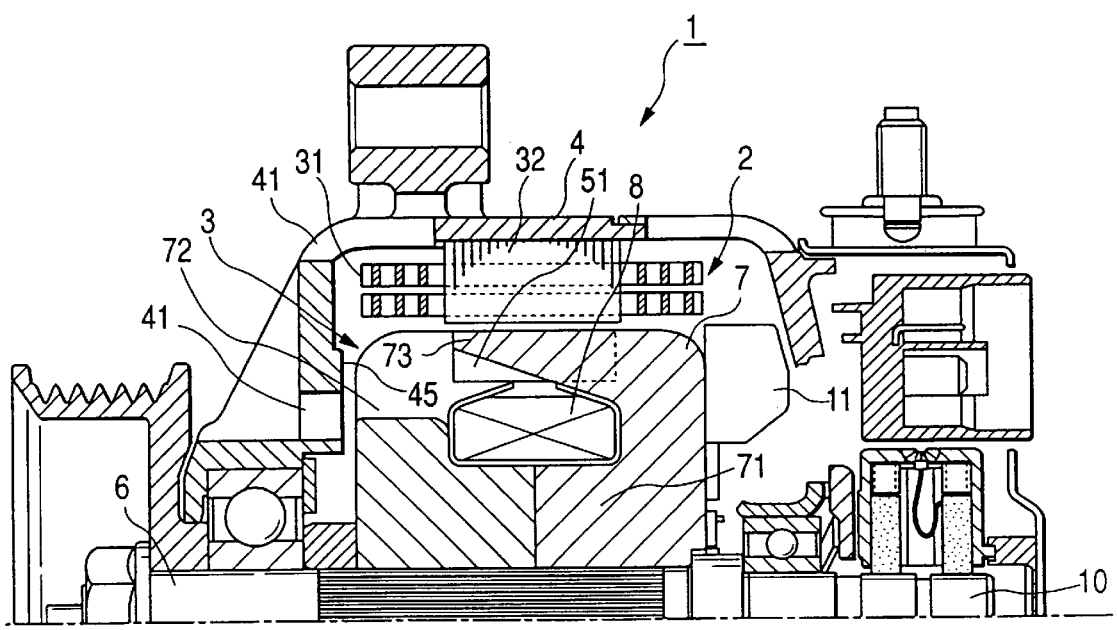

Furthermore, the arrangement shown in FIG. 19 can be adopted. An end face of the rotor 3, not provided with the cooling fan, confronts an inner wall surface 45 of the outer peripheral portion of the air inlet hole 41 of the frame 4. When the disk portion 72 of the pole core 7 functions as a fan, the inner wall surface 45 can serve as a fan shroud. The fan ability at the disk portion 72 is increased. Accordingly, compared with the above-described arrangement where the cooling fans are provided at the both ends of the rotor, it becomes possible to attain a comparable cooling ability without increasing the number of parts and man-hours. Furthermore, the size is reduced.

Figure 23:
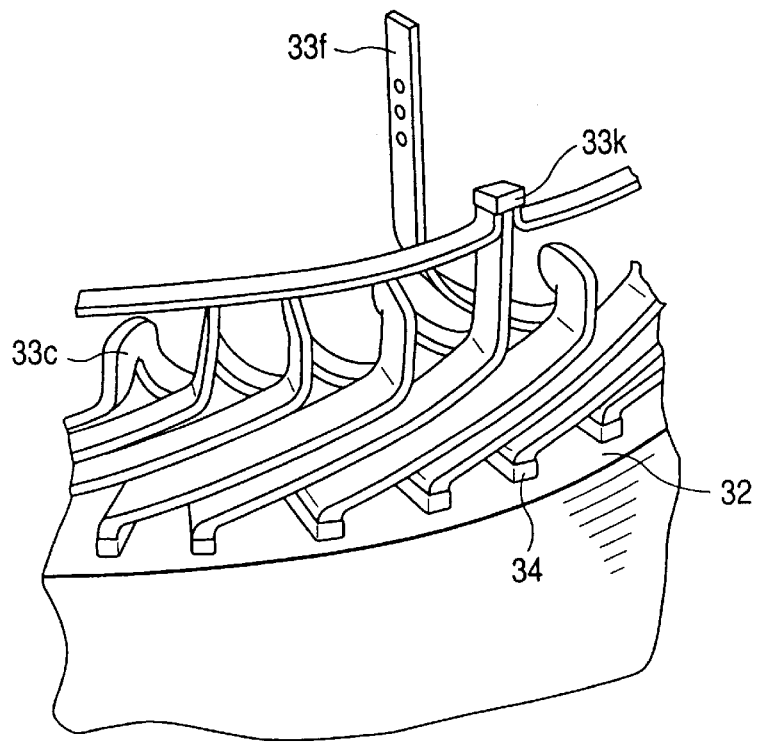
FIG. 23 is a perspective view showing a winding end of the stator in accordance with another embodiment.

As shown in FIG. 23, it is possible to provide the winding end 33f at the same side as the turn portions 33c. This arrangement is advantageous because the winding end 33f does not interfere with a welding operation performed at the joint portion side. Furthermore, the production process can be simplified due to a repetitive connection of the same pattern.

According to the above-described embodiments, the slot number is six times as large as the pole number. Some of the electric conductors accommodated in two adjacent slots are connected in series at an appropriate portion to realize a series of windings of 4 T. This may be referred to as a three-phase, double slot, serial winding. However, it is preferable to set the slot number nine times as large as the pole number. When the electric conductors accommodated in three adjacent slots are connected in series at appropriate portions, a 6 T arrangement is realized. This may be referred to as a three-phase, triple slot, serial winding. Furthermore, it is possible to realize an arrangement of an odd number of turns, e.g., 5 T, by connecting the conductors in parallel at an appropriate slot. It is needless to say that the T number can be further increased by increasing the slot number.

Figure 20:
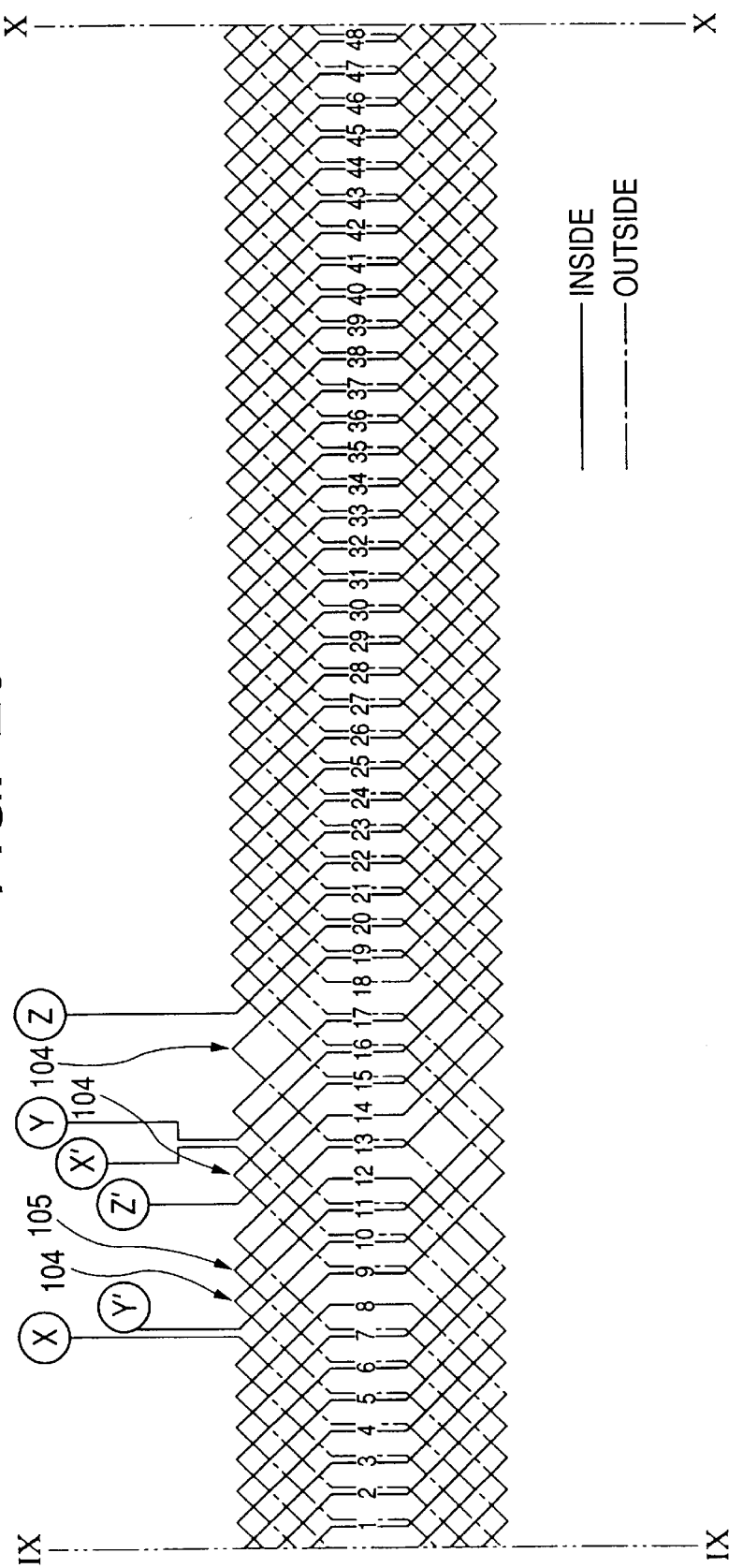
FIGS. 20 and 21 are developments cooperatively showing a winding connection of the stator in accordance with another embodiment of the present invention, where a series of stator windings is formed when
Figure 21:
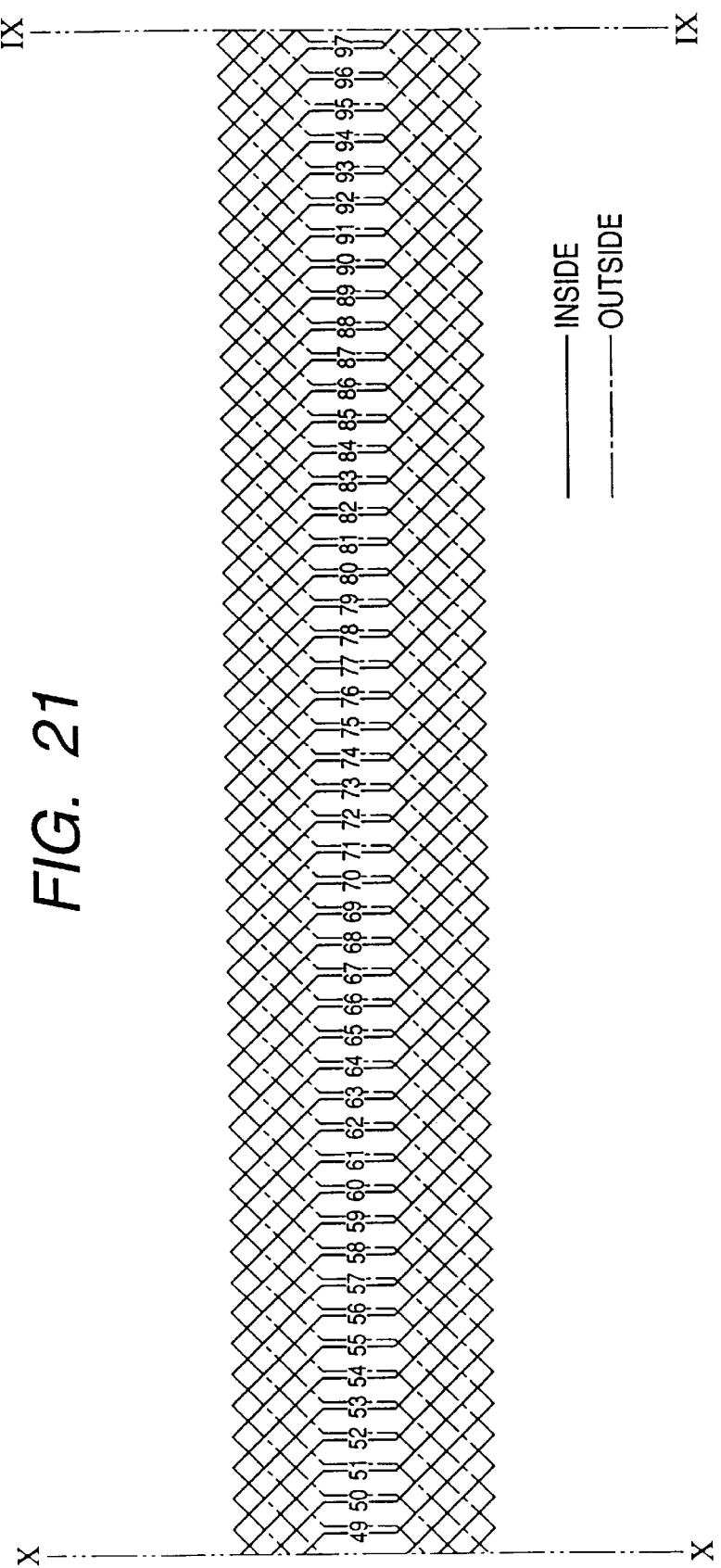

The number of slots provided in the stator core 32 can be increased by 1 from the above-described double slot arrangement. For example, a total of 97 slots are formed in the stator core 32. FIGS. 20 and 21 are developments showing detailed winding connections. In the drawing, the solid line represents an inner-layer electric conductor, while the alternate long and short dash line represents an outer-layer electric conductor. According to this arrangement, the shape, especially the height, of joint portions 104 and 105 can be equalized with that of other joint portions of the coil end. According to the winding arrangement shown in FIGS. 6 and 7, the joint portions 102 and 103 are different in height from other joint portions of the coil end. This requires electric conductors different in shape, and the connecting process will be complicated.

The joint portion 104 connects the electric conductors constituting different layers of adjacent slots. The joint portion 104 is identical in the inclination and height as other joint portions of the coil end. This is advantageous in that the length of each straight portion other than the turn portion can be equalized in the fabrication of the U-shaped segments. Thus, the process for producing the segments can be simplified. The joint portion 105 connects the electric conductors constituting the same layer. The joint portion 105 can be configured along an ordinary repetitive pattern, and the winding connecting process can thereby be simplified.

In this arrangement, it is possible to dispose the turn portions of the U-shaped conductor segments on the same side as the winding ends X and others shown in FIGS. 20 and 21. The spreads of the turn portions are all unified to a 6-slot pitch, which results in a simplified production process for the segments.

INDUSTRIAL UTILIZATION

As described in the foregoing description, the present invention eliminates interference at the coil end, increases the space factor of the stator winding, and improves the power output. Furthermore, as the inner and outer conductors are connected in series, both the conductor length and the leakage inductance of each phase winding depending on the position in the slot can be unified. Accordingly, the currents flowing across the coils can be equalized and the heat generation amount in each phase can be equalized. It becomes possible to eliminate local heat generation at the stator winding as well as the imbalance of the magnetic motive force. Temperature reduction and noise reduction can be realized. Furthermore, the stator winding is serially connected between adjacent slots. The conductor number per slot can be reduced so as to secure sufficient clearances between the conductors at the coil end. It becomes possible to obtain a turn number required for generating a satisfactory power output as an automotive generator at a low-speed region. Accordingly, the present invention can be utilized for alternators of automotive vehicles and contribute to the realization of their downsizing and power-up.

What is claimed is:

1. An alternator for an automotive vehicle, comprising:
    a field rotor with N and S poles formed alternately in a circumferential direction, a stator including a stator core disposed in a confronting relationship with said rotor and a multi-phase stator winding associated with said stator core, and a frame supporting said rotor and said stator, wherein
    said field rotor comprises a Lundel-type core having a plurality of hooked magnetic poles serving as said N and S poles,
    said stator core comprises laminated cores formed with a plurality of slots extending across laminated plates,
    said multi-phase stator winding comprises a plurality of conductor segments,
    said plurality of conductor segments are inserted in said slots so as to constitute an inner conductive layer and an outer conductive layer arrayed in a line exclusively in a depth direction of each slot, and are insulated from each other in each slot,
    said plurality of conductor segments are partially disposed out of said slots so as to extend from an end face of said stator core and form a coil end having a predetermined connecting pattern according to which different layers disposed in different slots spaced at an interval corresponding to a N-and-S magnetic pole pitch of said rotor are serially connected, thereby forming a coil end group chiefly repeating said connecting pattern at the end face of said stator core,
    said plurality of conductor segments of said coil end are spatially separated from each other and extend in a direction intersectional with a flow direction of cooling air introduced in said frame, so that the cooling air can flow along the surface of said conductor segments of said coil end, and
    said plurality of conductor segments constitute two or more pairs in each slot and arrayed in a line exclusively in a depth direction of each slot.

2. The alternator for an automotive vehicle in accordance with claim 1, wherein said multi-phase stator winding has a winding end as an output terminal, said stator and said rotor are cooperate to generate a voltage equal to or more than 15 volts from said winding end in an idling speed region of an engine which drives said rotor.

3. The alternator for an automotive vehicle in accordance with claim 1, wherein
    said Lundel-type core is defined by the following relationship $$L1/L2 \geq 1.5$$

where L1 represents an outer diameter of the hooked magnetic pole of said Lundel-type rotor, and L2 represents a length in a rotational axis of said Lundel-type rotor.

4. The alternator for an automotive vehicle in accordance with claim 1, wherein all of the conductor segments insulated in said slots are spatially separated at the coil end formed at an axial end portion of said stator core.

5. The alternator for an automotive vehicle in accordance with claim 1, wherein toothed core ends are positioned at both sides of said slot, and at least part of said toothed core is plastically deformed to form an opening of said slot having a width narrower than a distance between inner walls of said slot, said opening of said slot being provided at an inner peripheral side of said slot.

6. The alternator for an automotive vehicle in accordance with claim 1, wherein each electric conductor is formed into a rectangular shape fitting the configuration of a corresponding slot at a portion inserted in said slot.

7. The alternator for an automotive vehicle in accordance with claim 1, wherein
    said conductor segments are naked metallic members,
    an electrical insulating material is interposed between said plurality of conductor segments inserted in said slot as well as between said plurality of conductor segments and inner walls of said slot for assuring electric insulation, and
    said plurality of conductor segments are spatially separated at a portion outside said slot.

8. The alternator for an automotive vehicle in accordance with claim 1, wherein an overall axial length of said stator comprising said stator core and conductor segments accommodated in said slots is equal to or shorter than an overall axial length of said field rotor.

9. The alternator for an automotive vehicle in accordance with claim 1, wherein said electric conductor is formed at least partly into a flat configuration at a portion outside said slot.

10. The alternator for an automotive vehicle in accordance with claim 1, wherein a magnet is interposed between magnetic poles of said field rotor so that said stator is exposed to a magnet flux in addition to a field flux.

11. The alternator for an automotive vehicle with claim 1, wherein said plurality of conductor segments disposed at said coil end receive said cooling air at substantially entire surfaces thereof.

12. The alternator for an automotive vehicle in accordance with claim 1, wherein said coil end group is formed at each axial end portion of said stator core, and two cooling air passages are formed in said frame so as to correspond to respective coil end groups.

13. The alternator for an automotive vehicle in accordance with claim 1, wherein a ventilating means is provided for causing a flow of cooling air in said frame.

14. The alternator for an automotive vehicle in accordance with claim 13, wherein said ventilating means is provided at an axial end portion of said field rotor for causing the cooling air to flow in a centrifugal outer direction, so that the cooling air can flow across said conductor segments.

15. The alternator for an automotive vehicle in accordance with claim 14, wherein said ventilating means is provided at both axial end portions of said field rotor.

16. The alternator for an automotive vehicle in accordance with claim 14, wherein said ventilating means is a fan having a plurality of blades.

17. The alternator for an automotive vehicle in accordance with claim 13, wherein said Lundel-type core has a configuration corresponding to said plurality of hooked magnetic poles, so that Lundel-type core is capable of serving as said ventilating means.

18. The alternator for an automotive vehicle in accordance with claim 17, wherein an axial end portion of said Lundel-type core is disposed in an adjacent and confronting relationship to an inner wall surface of said frame.

19. The alternator for an automotive vehicle in accordance with claim 13, wherein said frame has an inlet hole for said ventilating means, said inlet hole faces to an end of an installed pulley which drives said field rotor, and an outermost diameter of said inlet hole is smaller than an outermost diameter of said pulley.

20. The alternator for an automotive vehicle in accordance with claim 1, wherein said frame has a ventilation hole at a portion corresponding to said coil end group, so that the cooling air can flow across said conductor segments.

21. The alternator for an automotive vehicle in accordance with claim 1, wherein
said coil end is formed by connecting end portions of said conductor segments extending from said slot, and
the end portion of one conductor segment has an angle and a length sufficient to span approximately a half of said magnetic pole pitch.

22. The alternator for an automotive vehicle in accordance with claim 21, wherein
each conductor segment is an U-shaped segment having two straight portions accommodated in different slots, and
an end portion of a first U-shaped segment and an end portion of a second U-shaped segment are connected according to said connecting pattern so as to form said coil end.

23. The alternator for an automotive vehicle in accordance with claim 22, wherein said plurality of U-shaped segments have turn portions each serving as said coil end protruding in an axial direction from one end face of said stator core, and said turn portions being mutually spaced so as to form a first coil end group;
said plurality of U-shaped segments have end portions protruding in an opposite axial direction from the other end face of said stator core, said end portions being connected according to a predetermined connecting pattern so as to constitute said coil ends mutually spaced so as to form a second coil end group.

24. The alternator for an automotive vehicle in according with claim 22, wherein a rectifier is disposed at a same side as the turn portion of said U-shaped segment and is connected to the winding end of said multi-phase stator winding.

25. The alternator for an automotive vehicle in accordance with claim 22, wherein a rectifier is disposed at a side opposed to the turn portion of said U-shaped segment and is connected to the winding end of said multi-phase stator winding.

26. The alternator for an automotive vehicle in accordance with claim 21, wherein
each conductor segment has two end portions protruding from both ends of a corresponding slot,
one coil end is formed at one end of said stator core by connecting one end portion of a first segment and one end portion of a second segment according to said connecting pattern, and
the other coil end is formed at the other end of said stator core by connecting the other end portion of said first segment and the other end portion of said second segment according to said connecting pattern.

27. The alternator for an automotive vehicle in accordance with claim 26, wherein a sum of circumferential lengths of both end portions of said electric conductor corresponds to said magnetic pole pitch.

28. The alternator for an automotive vehicle in accordance with claim 1, wherein a rectifying element is provided, and part of said conductor segment is directly connected to an electrode of said rectifying element.

29. The alternator for an automotive vehicle in accordance with claim 28, wherein said conductor segment connected to the electrode of said rectifying element has an easily deformable portion between said stator and the electrode of said rectifying element.

30. The alternator for an automotive vehicle in accordance with claim 1, wherein said stator comprises extended wiring portions mutually short-circuited for constituting a neutral point.

31. The alternator for an automotive vehicle in accordance with claim 1, wherein said conductor segments are electric conductors each having an elongated rectangular cross section, and a longitudinal direction of said cross section is disposed along a radial direction at said coil end.

32. The alternator for an automotive vehicle in accordance with claim 1, wherein
said plurality of conductor segments are connected with other conductor segments at said coil end group to form a plurality of joint portions, and
said plurality of joint portions are arranged into multiple loops and mutually spaced in both a circumferential direction and a radial direction in said coil end group.

33. An alternator for an automotive vehicle, comprising:
a field rotor with N and S poles formed alternately in a circumferential direction, a stator including a stator core disposed in a confronting relationship with said rotor and a multi-phase stator winding associated with said stator core, and a frame supporting said rotor and said stator, wherein
said stator has a plurality of slots for accommodating said multi-phase stator winding,
said multi-phase stator winding is constituted by connecting a plurality of conductor segments,
said plurality of conductor segments constitute two or more pairs in each slot and arrayed in a line exclusively in a depth direction of each slot, and are insulated from each other in each slot,
said plurality of conductor segments are partly disposed out of said slots so as to extend from an end face of said stator core and form coil ends, and said plurality of conductor segments are connected with each other so as to form a plurality of joint portions at said coil ends, and
said plurality of joint portions are arranged into multiple loops and mutually spaced in both a circumferential direction and a radial direction in said coil ends.

34. The alternator for an automotive vehicle in accordance with claim 33, wherein said plurality of joint portions are disposed so as to form a two-turn loop arrangement.

35. The alternator for an automotive vehicle in accordance with claim 33, wherein said stator comprises an impregnated resin.

36. An alternator for an automotive vehicle, comprising:

a field rotor with N and S poles formed alternately in a circumferential direction, a stator including a stator core disposed in a confronting relationship with said rotor and a multi-phase stator winding associated with said stator core, and a frame supporting said rotor and said stator, wherein said field rotor comprises a Lundel-type core having a plurality of hooked magnetic poles serving as said N and S poles, said stator core comprises laminated cores formed with a plurality of slots extending across laminated plates, said multi-phase stator winding comprises a plurality of conductor segments, said plurality of conductor segments are inserted in said slots so as to constitute an inner conductive layer and an outer conductive layer arrayed in a depth direction of each slot, and are insulated from each other in each slot, said plurality of conductor segments are partially disposed out of said slots so as to extend from an end face of said stator core and form a coil end having a predetermined connecting pattern according to which different layers disposed in different slots spaced at an interval corresponding to a N-and-S magnetic pole pitch of said rotor are serially connected, thereby forming a coil end group chiefly repeating said connecting pattern at the end face of said stator core, said plurality of conductor segments of said coil end extend in a direction intersectional with a flow direction of cooling air introduced in said frame, so that the cooling air can flow across said conductor segments of said coil end, said plurality of conductor segments constitute two or more pairs in each slot and arrayed in a line exclusively in a depth direction of each slot, said plurality of conductor segments are connected with other conductor segments at said coil end group to form a plurality of joint portions, and said plurality of joint portions are arranged into multiple loops and mutually spaced in both a circumferential direction and a radial direction in said coil end group.

* * * * *